US011243966B1

(12) United States Patent
Wong

(10) Patent No.: US 11,243,966 B1
(45) Date of Patent: Feb. 8, 2022

(54) DATA MODEL DESIGN SUPPORTING LOW LATENCY TIME-SERIES VOLUME PLANNING AND ANALYSIS

(71) Applicant: salesforce.com, inc., San Francisco, CA (US)

(72) Inventor: Carey Kai-Bun Wong, Medfield, MA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 17/034,819

(22) Filed: Sep. 28, 2020

(51) Int. Cl.
*G06F 16/2458* (2019.01)
*G06F 16/242* (2019.01)
*G06F 16/28* (2019.01)
*G06F 16/23* (2019.01)

(52) U.S. Cl.
CPC ...... *G06F 16/2477* (2019.01); *G06F 16/2308* (2019.01); *G06F 16/244* (2019.01); *G06F 16/282* (2019.01); *G06F 16/283* (2019.01)

(58) Field of Classification Search
CPC ............. G06F 16/2477; G06F 16/2308; G06F 16/282; G06F 16/244; G06F 16/283
USPC ...................................................... 707/602
See application file for complete search history.

(56) References Cited

U.S. PATENT DOCUMENTS

| | | | | |
|---|---|---|---|---|
| 8,161,075 B1* | 4/2012 | Long | .................. | G09B 7/02 707/793 |
| 9,870,417 B2* | 1/2018 | Saurel | ................. | G06F 16/2272 |
| 10,235,391 B2* | 3/2019 | Hoffman | .................. | G06F 16/21 |
| 10,671,595 B2* | 6/2020 | Upadhyaya | ......... | G06F 16/2365 |
| 10,838,933 B2* | 11/2020 | Marwah | ................ | G06F 16/217 |
| 2005/0065756 A1* | 3/2005 | Hanaman | .............. | G06F 16/283 703/2 |
| 2007/0050777 A1* | 3/2007 | Hutchinson | ......... | G06F 11/0781 718/104 |
| 2014/0365424 A1* | 12/2014 | Herbst | ............. | G06F 16/24561 707/607 |
| 2015/0213109 A1* | 7/2015 | Kassko | ................. | G06F 16/283 707/603 |
| 2016/0092487 A1* | 3/2016 | Upadhyaya | ......... | G06F 16/2365 707/694 |
| 2016/0155141 A1* | 6/2016 | Song | .................. | G06Q 30/0242 705/14.41 |

* cited by examiner

*Primary Examiner* — Shahid A Alam
(74) *Attorney, Agent, or Firm* — Holland & Hart LLP

(57) ABSTRACT

Methods, systems, and devices supporting data storage are described. A database system may implement a hierarchical organization in which child data objects store hierarchical data for parent data objects. However, to support low latency time-series volume planning and analysis, the database system may additionally store a data object with a first set of data fields that includes object-specific data for the data object and a second set of data fields that includes hierarchical data (e.g., time-based hierarchical data organized into separate data fields for different time segments) for the data object. The database system may support both transactions and analytical queries using the data model. For example, the database system may receive a query indicating a time period for predictive analysis and may execute the query on the second set of data fields for the data object (e.g., without searching for child data objects storing the time-based hierarchical data).

20 Claims, 10 Drawing Sheets

DATA MODEL DESIGN SUPPORTING LOW LATENCY TIME-SERIES VOLUME PLANNING AND ANALYSIS

FIELD OF TECHNOLOGY

The present disclosure relates generally to database systems and data processing, and more specifically to a data model design supporting low latency time-series volume planning and analysis.

BACKGROUND

A cloud platform (i.e., a computing platform for cloud computing) or an on-premise platform—both of which may be referred to as a platform—may be employed by many users to store, manage, and process data using a single or shared network of remote servers. Users may develop applications on a platform to handle the storage, management, and processing of data. In some cases, the platform may utilize a multi-tenant database system. Users may access the platform using various user devices (e.g., desktop computers, laptops, smartphones, tablets, or other computing systems, etc.).

In one example, the platform may support customer relationship management (CRM) solutions. This may include support for sales, service, marketing, community, analytics, applications, and the Internet of Things. A user may utilize the platform to help manage contacts of the user. For example, managing contacts of the user may include analyzing data, storing and preparing communications, and tracking opportunities and sales.

Some platforms may use multiple different database systems for maintaining and analyzing data records. A transactional database (e.g., an online transactional processing (OLTP) database) may be used to maintain transactional data, an analytical database (e.g., an online analytical processing (OLAP) database) may be used to report on analytics information (e.g., the sales of products and services), and a write-back analytical database (e.g., a relational online analytical processing (ROLAP) database) may be used to adjust data predictions (e.g., a financial forecast) at multiple levels of a time-series hierarchy. Utilizing multiple different database systems for a single process may be associated with high costs (e.g., including significant storage, processing, and integration overhead).

DETAILED DESCRIPTION

Figure 1:
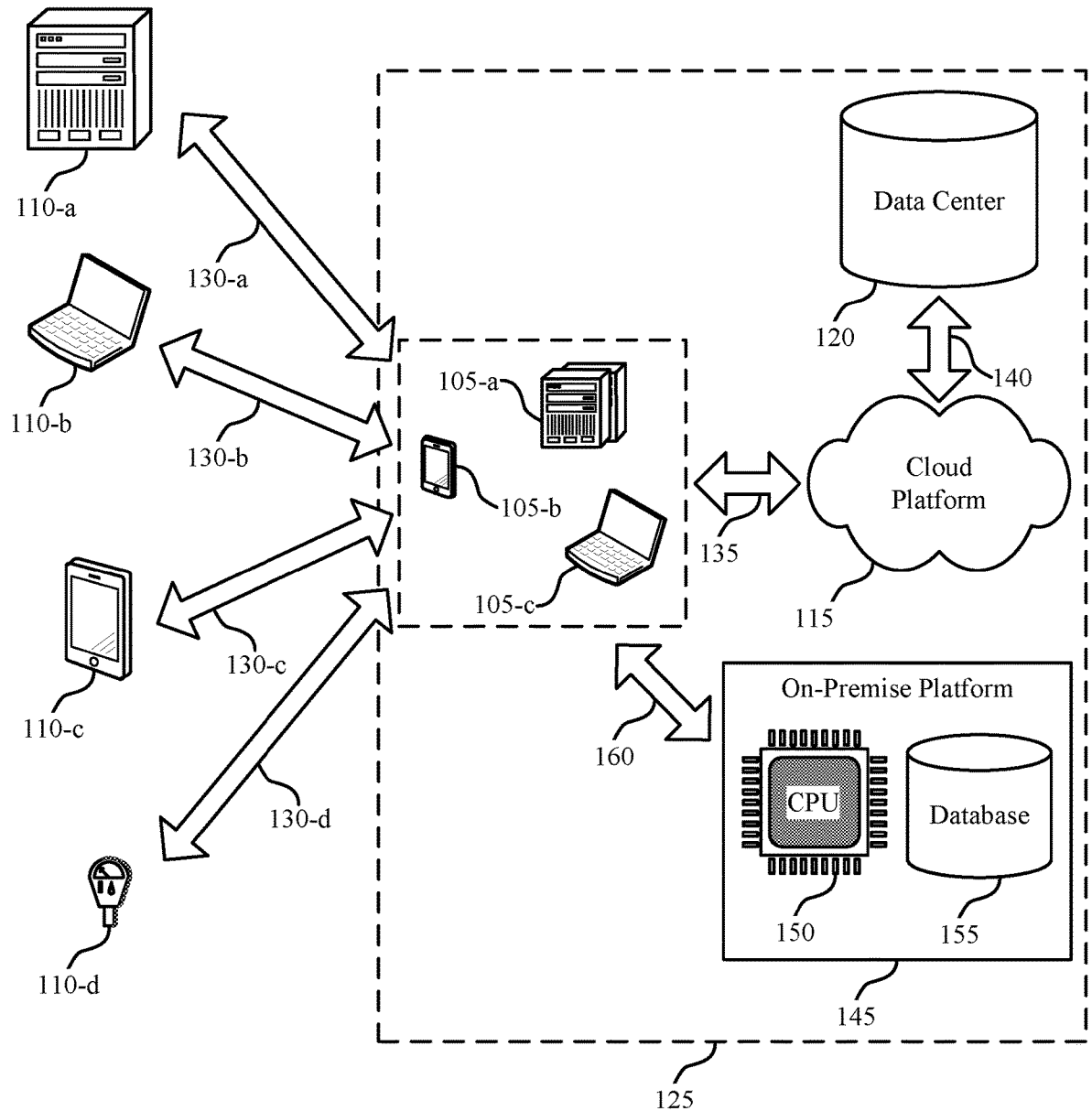
FIG. 1 illustrates an example of a system for data management that supports a data model design supporting low latency time-series volume planning and analysis in accordance with aspects of the present disclosure.

Some systems may use multiple different database types for maintaining and analyzing data records. In some systems, a transactional database (e.g., an online transactional processing (OLTP) database) may be used to maintain transactional data, an analytical database (e.g., an online analytical processing (OLAP) database) may be used to roll-up forecasted future transactions and/or the effects of future transactions (e.g., the sales of products or services) on the future forecast, and a relational online analytical processing (ROLAP) database may be used to allocate values down a hierarchy or aggregate values up a hierarchy. Maintaining multiple different database systems may be associated with high financial, storage, processing, and integration costs, and time-series related queries executed on the transactional database may involve increased time and compute resources (e.g., as compared to time-series queries executed on an OLAP or ROLAP database). In some cases, the analytical database may store transactional data imperfectly or perform a data analysis based on old or inaccurate data, which may result in inaccurate sales forecasts. For example, a transactional database may perform periodic updates to synchronize with the analytical database, but the analytical database may execute a forecasting query before a write query is executed by the transactional database, resulting in performing the forecasting on out-of-date information. Additionally or alternatively, executing queries on OLTP databases modelled to look and perform like analytical databases may involve significantly increased time and compute resources (e.g., as compared to executing queries on OLTP databases that are modelled with a normalized data model).

As described herein, a single database system may implement a data model design that supports the execution of transactional and analytical database queries. For example, the database system may store data objects that include data fields indicating a temporal hierarchy, and the data objects may support performing a time-series analysis for sales forecasting without querying or identifying child records of the data objects. The database system may store the temporal hierarchical data in a discrete number of data fields of a database object, which may allow the database system to avoid additional queries to identify the temporal hierarchical data from separate data objects (e.g., child data objects). In some cases, the database system may support performing transactional and analytical queries at a single database system, which may reduce the financial, storage, processing, and integration costs associated with maintaining separate database systems for managing transactions and forecasting. Additionally or alternatively, handling transactional and analytical queries at a single database system may improve the accuracy of analytical queries (e.g., time-series analysis, sales forecasting, etc.) based on the queries running on up-to-date transactional information. In some examples, the database system may improve performance by reducing query run-time (e.g., because running the query may not involve synchronizing multiple databases), thereby reducing system latency and improving user experience.

The database system may be configured to store data objects including parent-child relationships. For example, the database system may store a set of "parent" data objects including a first set of object-specific data for the set of parent data objects, and the database system may store a set of "child" data objects including a first set of hierarchical data for the set of parent data objects. A child data object may refer to a data object including a relationship indicator indicating another data object as a parent data object (e.g., using a foreign key). Each child data object may further include a respective set of data fields that stores a subset of the first set of hierarchical data and a respective unique identifier for the child data object (e.g., a primary key). The hierarchical data may be an example of data related to any type of hierarchy for organizing information in the database system. For example, if a parent data object corresponds to an account, child data objects for this parent data object may correspond to products being purchased by the account. However, rather than storing data related to a temporal hierarchy as child data objects, the database system may be configured to store, for a data object, a set of data fields that store a second set of hierarchical data (e.g., temporal hierarchical data) for the data object. For example, the data object may include a first set of data fields including a second set of object-specific data for the data object, a second set of data fields including the second set of hierarchical data, and a unique identifier (e.g., a primary key) that supports querying the data object in the database system. Data fields in the second set of data fields may store a subset of the second set of hierarchical data according to a temporal hierarchy that defines the second set of data fields. That is, each data field of the second set of data fields may store data associated with a specific time period for a data object. By storing such information in data fields at the data object, rather than in child data objects associated with the data object, the database system may reduce the number of records in the database and similarly reduce query processing and latency involved in accessing temporal hierarchical data.

For example, the database system may receive a query (e.g., a time-series analysis query, a sales forecasting query, etc.) indicating a time period for data analysis and access a data object based on the query and the unique identifier of the data object. The database system may execute the query on the data object, and the query may be executed on at least a portion of the second set of data fields based on the indicated time period and the temporal hierarchy. In this way, to run a forecasting projection, the database system may access a single data object, write to one or more of the data fields storing planned or forecasted time-based data (e.g., predictive data), and provide forecasting results based on the planned or forecasted time-based data. Because the second set of hierarchical data is stored at the data object according to the temporal hierarchy, rather than in child data objects for the data object, the database system may execute the query without querying additional data objects (e.g., child data objects) to perform forecasting operations on the time-based hierarchical data.

Aspects of the disclosure are initially described in the context of an environment supporting an on-demand database service. Aspects of the disclosure are then described in the context of a data record storage technique, a data object transformation technique, a data object storage technique, and a process flow. Aspects of the disclosure are further illustrated by and described with reference to apparatus diagrams, system diagrams, and flowcharts that relate to data model design supporting low latency time-series volume planning and analysis.

FIG. 1 illustrates an example of a system 100 for data management that supports a data model design supporting low latency time-series volume planning and analysis in accordance with aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level and may not have access to others.

Contacts 110 may interact with the cloud client 105 in person or via phone, email, web, text messages, mail, or any other appropriate form of interaction (e.g., interactions 130-*a*, 130-*b*, 130-*c*, and 130-*d*). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-*a*), a laptop (e.g., contact 110-*b*), a smartphone (e.g., contact 110-*c*), or a sensor (e.g., contact 110-*d*). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. For example, the system 100 may additionally or alternatively include an on-premise platform 145. The on-premise platform 145 may include a central processing unit (CPU) 150, a database 155, or both. The on-premise platform 145 and a cloud platform 115 may operate independently or may share data storage and processing operations. In some cases, the cloud platform 115, the on-premise platform 145, or both may support CRM solutions. This may include support for sales, service, marketing, community, analytics, applications, and the Internet of Things. The cloud platform 115, the on-premise platform 145, or both may receive data associated with contact interactions 130 from the cloud client 105 over network connection 135, network connection 160, or bothand may store and analyze the data. In some cases, a platform (e.g., the cloud platform 115 or the on-premise platform 145) may receive data directly from an interaction 130 between a contact 110 and the cloud client 105. In some cases, the cloud client 105 may develop applications to run on a platform. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, on-premise platform 145, data center 120, or any combination thereof. In some cases, data processing may occur at any of the components of subsystem 125, or at a combination of these components. In some cases, servers may perform the data processing. The servers may be a cloud client 105 or located at data center 120 or the on-premise platform 145.

In some cases, the data center 120 or the on-premise platform 145 may include multiple databases 155, servers, or other types of systems. For example, the data center 120 may include an application server and/or a transactional database. In some cases, the data center 120 may support low latency time-series analysis information forecasting. The data center 120 may store object-specific data for a data object in data fields associated with the data object and may store hierarchical data associated with the data object in a set of child data objects for the data object. However, the data center 120 may be configured to store some types of hierarchical data in data fields associated with the data object. For example, a data object may store a first set of data fields that store a set of object-specific data, a second set of data fields that store a set of hierarchical data (e.g., temporal hierarchical data or other hierarchical data), and a unique identifier that supports querying the data object. A data field of the second set of data fields may store a subset of the hierarchical data according to a temporal hierarchy. The data center 120 may receive a query indicating a time period, access a data object based on the query and the unique identifier of the data object, and execute the query on a portion of the second set of data fields based on the indicated time period and the temporal hierarchy. Running a low latency time-series analysis at a transactional database may reduce query run-time, increase query accuracy, and improve user experience.

In some other systems, an organization may maintain multiple different databases for maintaining and analyzing data records. A transactional database (e.g., an OLTP database) may be used to maintain transactional data, and an analytical database (e.g., an OLAP database) may be used to perform a time-series analysis as part of a sales forecasting procedure. Maintaining multiple different database systems may be associated with high financial cost for processing, storage, and integration. In some cases, the analytical database may perform a data analysis based on old or inaccurate data, which may result in inaccurate sales forecasts. Therefore, the system may degrade user experience and decrease system reliability.

In contrast, the system 100 may implement low latency time-series analysis at a data center 120 configured to support both transactions and forecasting, which may reduce query runtime, increase query accuracy, and improve user experience. For example, a data center 120 configured with hierarchical organization may store temporal hierarchical data in a single data object, rather than across multiple child data objects. For example, because temporal hierarchical data is typically organized across a discrete number of subsets (e.g., across a number of days, weeks, or months in a year), the dynamic growth supported by using child data objects to store this type of hierarchical data may not be valuable to the data center 120. Additionally, the number of records involved in storing this temporal hierarchical data in child data records may be costly to the data center 120. As such, storing this type of hierarchical data in data fields in a single data object may support maintaining accurate information in the data center 120 while significantly reducing the number of data records stored in the data center 120. For example, storing time-based data in fifty-four columns (e.g., corresponding to different weeks in a year) at a single record, as opposed to in fifty-four children records of the single record, may effectively reduce the record-based data volume of the data center 120 by over 98% and the number of queries run by 98% or more. That is, because searching in the data center 120 is performed on the child data records, the number of records queried, as opposed to the number of columns referenced, is a much greater indicator of performance, run time, and processing overhead. Such a data model design may reduce query run time, increase calculation accuracy, and improve user experience.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Database systems and computing platforms may record transactional data and perform a time-series analysis to forecast sales data. For example, a database system may record the purchase of a pair of shoes in a transactional database and perform a time-series analysis to forecast expected revenues due to the sale of shoes and forecasted revenues based on a potential shoe discount or promotion. The database system may include a number of time periods that are stored as data fields, which may allow a database system (e.g., an OLTP database) to perform transactional and analytical queries in an accurate and efficient manner.

Figure 2:
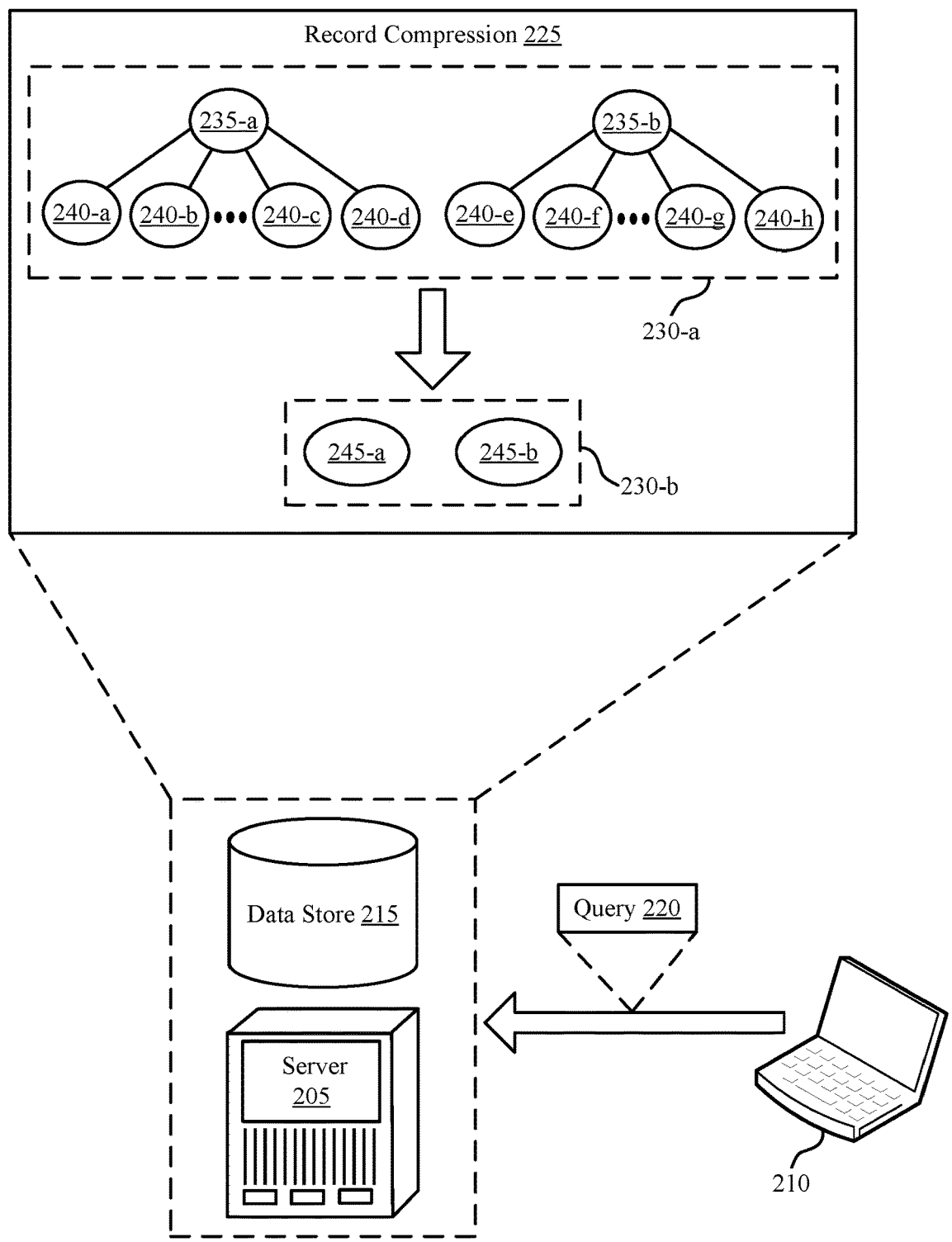
FIG. 2 illustrates an example of a data record storage technique that supports a data model design supporting low latency time-series volume planning and analysis in accordance with aspects of the present disclosure.

FIG. 2 illustrates an example of a data record storage technique 200 that supports a data model design supporting low latency time-series volume planning and analysis in accordance with aspects of the present disclosure. The data record storage technique 200 includes a server 205, a user device 210, and a data store 215. The data record storage technique 200 may implement aspects of a system 100 as described with reference to FIG. 1. For example, the server 205 and/or the data store 215 may be examples or components of a data center 120 or an on-premise platform 145, and the user device 210 may be an example of a cloud client 105 or a contact 110.

The data store 215 may store a set of data objects, and some of the data objects may store information related to a temporal hierarchy that supports an efficient data analysis process (e.g., time-series analysis, sales forecasting, etc.). For example, the data store 215 may include a number of parent data objects 235 and a number of child data objects 240, where the child data objects 240 may store temporal hierarchical data. The server 205 (e.g., a database server, an application server, a server cluster, a virtual machine, a container, or some combination of these or other hardware or software components supporting data processing for the database system) may receive a query 220 from the user device 210, and the query 220 may indicate a time period for analysis. For example, the query 220 may indicate the current fiscal year as the time period for analysis. The data store 215 may access a set of data objects based on the query 220 and execute the query 220 on the set of data objects (e.g., child data objects 240) based on the indicated time period and the temporal hierarchy of each child data object 240 in the set of child data objects 240.

In some cases, the data record storage technique 200 may support a record compression procedure 225 that transforms a set of child data objects 240 for a parent data object 235 into a single data object 245. In some other cases, the data record storage technique 200 may support a data store 215 being configured to store data objects according to a second set of data objects 245 (e.g., without performing a compression or update from a different data model). If performing a record compression procedure 225 from a first data model to a second data model, the server 205 may transmit a command to the data store 215 to convert the first set of data objects 230-*a* into the second set of data objects 230-*b*. The first set of data objects 230-*a* may include a number of parent data objects 235 and a number of child data objects 240 that each reference one of the parent data objects. For example, child data object 240-*a*, child data object 240-*b*, child data object 240-*c*, and child data object 240-*d* may each reference parent data object 235-*a* (e.g., each child data object 240 may contain a foreign key referencing a primary key of parent data object 235-*a*), and child data object 240-*e*, child data object 240-*f*, child data object 240-*g*, and child data object 240-*h* may each reference parent data object 235-*b*. Such references may be used to access a parent data object 235 from a child data object 240 in the data store 215. The child data objects 240 may include hierarchical data and a unique identifier (e.g., a primary key). In some cases, each parent data object 235 may be associated with any number of child data objects 240, while in some other cases, each parent data object 235 may be associated with a maximum number of child data objects 240.

Each data object 245 in the second set of data objects 230-*b* may include a unique identifier (e.g., a primary key) and a number of data fields that store hierarchical data according to a temporal hierarchy. For example, data object 245-*a* may include data corresponding to a parent data object (e.g., parent data object 235-*a*) and a number of child data objects (e.g., child data object 240-*a*, child data object 240-*b*, child data object 240-*c*, and child data object 240-*d*) if stored according to the first set of data objects 230-*a*, and the data object 245-*b* may include data corresponding to a parent data object (e.g., parent data object 235-*b*) and a number of child data objects (e.g., child data object 240-*e*, child data object 240-*f*, child data object 240-*g*, and child data object 240-*h*). The data object 245-*a* and the data object 245-*b* may store the data corresponding to the child data objects 240 in data fields according to a temporal hierarchy, thereby reducing the overall number of data objects in the data store 215 (e.g., as compared to a system storing data according to the first set of data objects 230-*a*).

In some cases, each parent data object 235 of the first set of data objects 230-*a* may be associated with a maximum number of child data objects 240, and the data store 215 may convert each child record into one or more fields of a data record of the second set of data objects 230-*b*. In some additional or alternative cases, each parent data object 235 of the first set of data objects 230-*a* may be associated with any number of child data objects 240, and the data store 215 may discretize the child records into one or more fields of a data record of the second set of data objects 230-*b*.

In some cases, storing temporal information in a set of multiple data fields of a data object 245 may support applying formulas within an object, rather than across objects. In some examples, a data field for a data object 245 may include a formula (e.g., a custom formula or another formula) based on one or more other data fields in the data store 215. For example, a formula field may be an example of a cross-object formula or a summary rollup field. In some such examples, formulas that are based on one or more related objects may use a significant amount of processing resources to maintain, as any update to one of the related objects may result in an update to the field (e.g., based on the definition of the formula). In some examples, updating the value stored in the formula field may involve a search process performed in the data store 215 to ensure all formulas based on an updated value are also updated based on the updated value. However, by storing time-based hierarchical information at the record-level for a data object 245, rather than across multiple child data objects 240, the data object 245 may support formula fields based on the time-based hierarchical information without using cross-object references. If the data store 215 includes a limit on the number of cross-object references supported in a formula, rules on a lookup direction (e.g., child-to-parent or parent-to-child) supported for cross-object references in a formula, or both, storing the time-based hierarchical information in fields of a single data object 245 may support improved robustness for formula fields (e.g., as compared to storing the time-based hierarchical information in child data objects 240).

Additionally or alternatively, a query 220 may support one or more formulas (e.g., to set conditions for the query, to determine a resulting value for a query, etc.). Query formulas may improve a user's ability to perform time-series volume planning, a time-series analysis, a sales forecasting, or the like. In some examples, a user may select or define a formula for a query 220 (e.g., a structured query language (SQL) query) via the user device 210, and the user device 210 may display query results according to the formula. For example, the user may define a mathematical formula (e.g., an average, a sum, a difference, a product, a quotient, a median, a mode, etc.) across one or more data objects and/or one or more data fields, and the user device 210 may display query results based on the mathematical formula. If the query formula is based on multiple data objects, executing the query may involve searching the data store 215 for a number of data objects, increasing the processing overhead and latency involved in executing the query. However, if the query formula is based on multiple data fields at a single data object 245 (e.g., multiple data fields including time-based hierarchical information for the data object 245), executing the query may involve searching the data store 215 for the data object 245—and not multiple child data objects 240— such that the processing overhead and latency involved in executing the query 220 is reduced.

The condensed data model corresponding to the second set of data objects 230-b may support real-time forecasting in a transactional database. For example, the second set of data objects 230-b may support a trade promotion planning process in a trade promotion management (TPM) solution. TPM is an example of a business process in the consumer goods industry that may involve consumer product manufacturers providing discounts to their customers to encourage their customers to put specific products on sale. Within a data store 215 supporting an enterprise resource planning (ERP) system, TPM may involve capturing a trade promotion by a salesperson (e.g., a key account manager) and sending the trade promotion to the data store 215 for financial execution. Additionally or alternatively, TPM may involve tracking orders (e.g., as transactions in the data store 215) to determine total discounts provided to customers for financial accounting purposes.

Simply tracking orders to support TPM may be supported by a transactional database. However, a transactional database may fail to support a user (e.g., a sales manager) analyzing the forecasted volume effects of different discounts. For example, a user operating the user device 210 may analyze whether a single promotion at a 20% discount will result in more profits than two promotions each at a 10% discount. Such an analysis may use a planning tool, rather than a transactional tool. To provide an answer to the above analysis, the data store 215 may support time-series volume planning, involving updating large volumes of forecasted data to predict how such promotions may affect profits (or perform other forecasting operations). In some cases, the large volume of forecasted data records may negatively affect the performance of the transactional database. However, by condensing multiple child data records 240 into a parent data record 235 (e.g., as data objects 245) to support time-series volume planning (e.g., where the forecasted information is stored as one or more data fields in a data object 245, rather than as one or more child data records of the data object), the data store 215 (e.g., a transactional database) may significantly reduce the overhead associated with time-series volume planning. Such a data model design may additionally or alternatively support any number of time-series planning functions.

Some database systems may time out if a query exceeds a threshold amount of time during execution, exceeds a threshold number of compute resources for execution, or both (e.g., to fairly share resources and balance processing load across a number of tenants in a multi-tenant system). Additionally or alternatively, an organization (e.g., a tenant) may store up to a threshold number of data records in a database system (e.g., based on a license obtained by the organization, based on available storage resources, etc.). The data model design described herein may support running complex analytical queries without causing query execution time out, storing a robust number of data objects with time-based hierarchical information without exceeding a storage threshold, or both. Furthermore, the data model design may support a hierarchical-based organization of data in a transactional database to support analytics on the hierarchical information without overloading the system and causing system calls to crash or otherwise fail to handle real-time or pseudo-real-time transactions, for example, by removing a level of the hierarchy (e.g., the time-based level of the hierarchy) to significantly reduce the number of data records involved in accurately storing the information.

Figure 3:
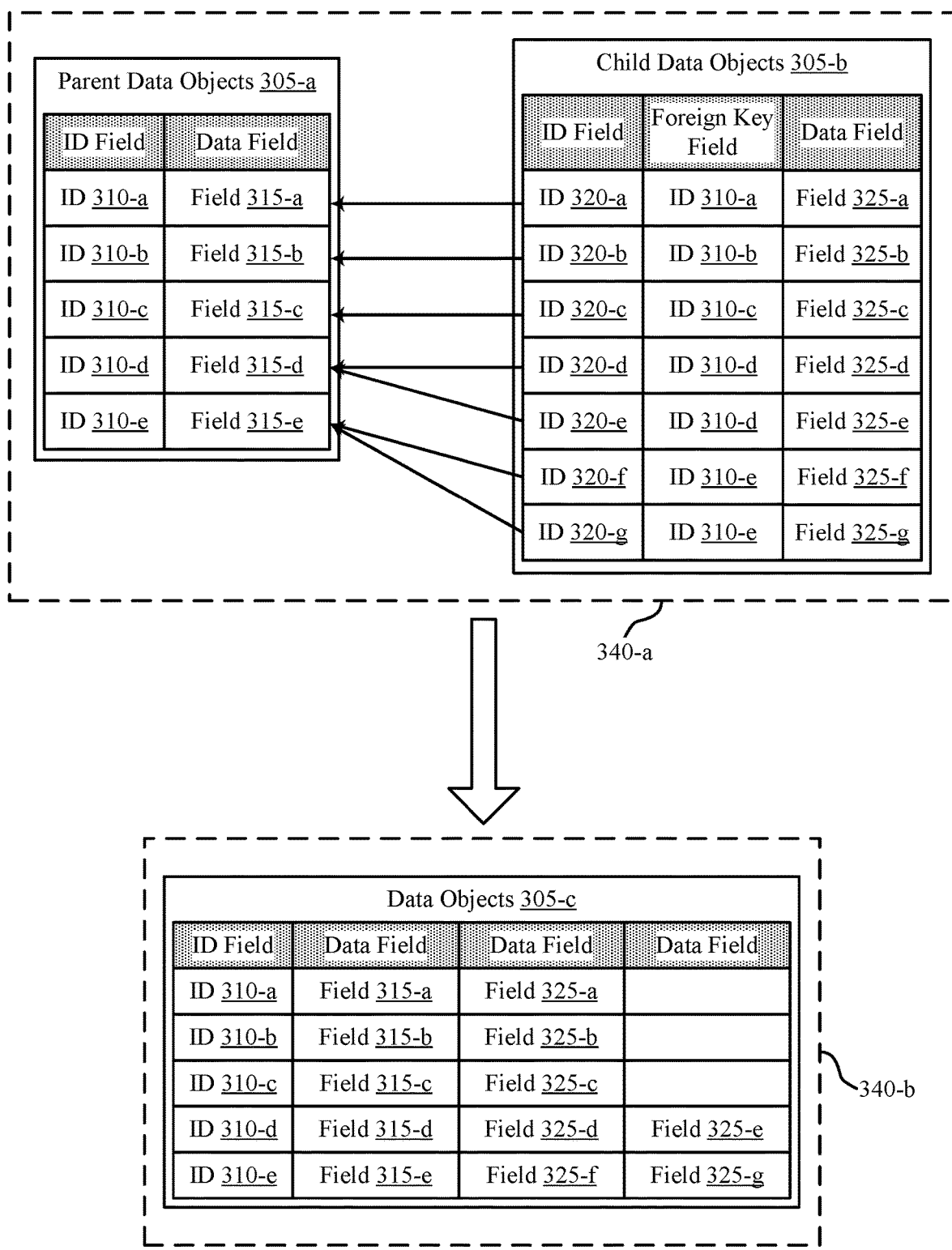
FIG. 3 illustrates an example of a data object transformation technique that supports a data model design supporting low latency time-series volume planning and analysis in accordance with aspects of the present disclosure.

FIG. 3 illustrates an example of a data object transformation technique 300 that supports a data model design supporting low latency time-series volume planning and analysis in accordance with aspects of the present disclosure. The data object transformation technique 300 may be performed by an example or component of a data center 120 or on-premise platform 145, as described with reference to FIG. 1. For example, the data object transformation technique 300 may be performed at a database or database system, such as an OLTP database.

The data object transformation technique 300 may transform a first set of data objects 340-a into a second set of data objects 340-b. In some examples, the first set of data objects 340-a may correspond to a structure for storing data in an OLAP database, while the second set of data objects 340-b may correspond to a structure for storing data in an OLTP database in order to support time-series volume planning at the OLTP database. The first set of data objects 340-a may include a parent data object table 305-a and a child data object table 305-b, and each data object in the child data object table 305-b may point to (e.g., reference via a foreign key) a data object in the parent data object table 305-a. Each data object in the parent data object table 305-a may contain a unique identifier 310 and one or more data fields 315. Each data object in the child data object table 305-b may contain a unique identifier 320, a foreign key referencing a unique identifier 310 of a parent data object in a parent data object 305-a, and one or more data fields 325. In some cases, the data fields 315 may contain object-specific data for a parent data object (e.g., data that does not add value if segmented into smaller portions based on a hierarchy or data aggregated from a lower level of the hierarchy). For example, data field 315-a may contain data corresponding to a first parent data object that includes unique identifier 310-a, data field 315-b may contain data corresponding to a second parent data object that includes unique identifier 310-b, data field 315-c may contain data corresponding to a third parent data object that includes unique identifier 310-c, data field 315-d may contain data corresponding to a fourth parent data object that includes unique identifier 310-d, and data field 315-e may contain data corresponding to a fifth parent data object that includes unique identifier 310-e. In some cases, the data fields 315 may contain data corresponding to a product or service.

The data objects in the child data object table 305-b may store hierarchical data that is associated with the parent data object table 305-a. A data object in the child data object table 305-b may include a set of data fields that stores a subset of data associated with a data object in the parent data object table 305-a according to a specific hierarchy (e.g., in a data field 325) and a unique identifier (e.g., a unique identifier 320). The set of data fields may also store an object reference indicating a relationship to a data object of the parent data object table 305-a. For example, the data objects in the child data object table 305-b may include an additional field storing a unique identifier 310 (e.g., a foreign key) that points to or otherwise references a data object of the parent data object table 305-a. In some cases, the data fields 325 may contain hierarchical data for a parent data object (e.g., data that is of value in the aggregate for the parent data object, but also provides value based on a segmentation at the child-level). For example, a first child data object of the child data object table 305-*b* may correspond to the first parent data object (e.g., by referencing the first parent data object in a lookup relationship or another relationship field) and include unique identifier 320-*a* (e.g., to support querying the child data object in the child data object table 305-*b*) and data field 325-*a* (e.g., including a subset of data for the parent data record, such as sales information for a specific week of the year), a second child data object of the child data object table 305-*b* may correspond to the second parent data object and include unique identifier 320-*b* and data field 325-*b*, a third child data object of the child data object table 305-*b* may correspond to the third parent data object and include unique identifier 320-*c* and data field 325-*c*, a fourth child data object of the child data object table 305-*b* may correspond to the fourth parent data object and include unique identifier 320-*d* and data field 325-*d*, a fifth child data object of the child data object table 305-*b* may correspond to the fourth parent data object and include unique identifier 320-*e* and data field 325-*e*, a sixth child data object of the child data object table 305-*b* may correspond to the fifth parent data object and include unique identifier 320-*f* and data field 325-*f*, and a seventh child data object of the child data object table 305-*b* may correspond to the fifth parent data object and include unique identifier 320-*g* and data field 325-*g*.

The data objects in the data object table 305-*c* may store a first set of data fields (e.g., data field 315-*a*, data field 315-*b*, data field 315-*c*, data field 315-*d*, and data field 315-*e*) that includes object-specific data and a second set of data fields (e.g., data field 325-*a*, data field 325-*b*, data field 325-*c*, data field 325-*d*, data field 325-*e*, data field 325-*f*, and data field 325-*g*) that includes hierarchical data. In some cases, the first set of data fields may correspond to data associated with the parent data object table 305-*a* and the second set of data fields may correspond to data associated with the child data object table 305-*b*. A first data object of the data object table 305-*c* may be identified with unique identifier 310-*a* and include data field 315-*a* (e.g., corresponding to data for a parent data object) as well as data field 325-*a* (e.g., corresponding to hierarchical data). A second data object of the data object table 305-*c* may be identified with unique identifier 310-*b* and include data field 315-*b* as well as data field 325-*b*. A third data object of the data object table 305-*c* may be identified with unique identifier 310-*c* and include data field 315-*c* as well as data field 325-*c*. A fourth data object of the data object table 305-*c* may be identified with unique identifier 310-*d* and include data field 315-*d*, data field 325-*d*, and data field 325-*e*. A fifth data object of the data object table 305-*c* may be identified with unique identifier 310-*e* and include data field 315-*e*, data field 325-*f*, and data field 325-*g*.

In some examples (as illustrated), the database may store hierarchical information as separate columns in a data object table 305-*c*. For example, a data object type may include a number of columns for storing time-based information. In some examples, the data object may include fifty-four columns corresponding to a first set of time-based information, and one or more additional sets of fifty-four columns corresponding to additional sets of time-based information. For example, a product data object may include fifty-four sales columns indicating a number of sales for the product per week and fifty-four production columns indicating a number of the products produced per week. Accordingly, for a single product data record, the database system may store a single data object as a row in the data object table 305-*c* with a unique identifier 310 for querying the data object and at least one hundred eight columns for the time-based hierarchical information. Alternatively, other numbers of columns may be supported for storing the time-based hierarchical information at a single data object. Other database systems (e.g., OLAP databases) may store such information as a data object in a row of the parent data object table 305-*a* and fifty-four child data objects in fifty-four rows of the child data object table 305-*b*, each with two data fields 325 corresponding to sales information and production information for the time period associated with the corresponding child data objects.

In some examples, the data model of a time-series volume planning tool may look similar to an OLAP data model. An OLAP data model may be used for analytical reporting. Some time-series volume planning tools may allow users to write to the database at different nodes (e.g., data objects) and intelligently update other nodes. To update the other nodes, a planning tool may aggregate numbers up hierarchies and allocate numbers down the hierarchies. As an illustrative example, a consumer goods company may have 1,000 customers in a given market, each with 500 products for which the company plans annual volumes at the weekly level. In an OLAP hierarchical system, where the product data objects may be stored as child records to the customer data objects, and the weekly volume information may be stored as child records to the product data objects, there may be approximately 26,000,000 customer-product-week records in the planning tool. As such, updating a large percentage of these records on a frequent basis may be associated with long query run-times and significant processing overheads.

The data object transformation technique 300 may support combining the reliability and speed of an OLTP database with the forecasting ability of an OLAP database. As an example, many companies (e.g., approximately 99%) may perform their detailed planning on an annual basis, where there are a maximum number of 54 weeks in a year (e.g., 52 full weeks and potentially 2 partial weeks). The data object transformation technique 300 may, in some cases, take this information into account to design a fast and reliable database system that also supports time-series analysis and/or sales forecasting. For example, a number of time periods (e.g., 54) may be included as columns of a data object instead of as child data objects of the data object, which may yield a large reduction (e.g., 98%) in data volume. The data object transformation technique 300 may additionally yield a large reduction (e.g., 98%) in computationally expensive queries (e.g., queries involving identifying child data objects for every identified data object, cycling through a child data object table, etc.). That is, for queries that involve identifying the time-based hierarchical information for a data object, the query may search through the data object table 305-*c* for the data object with the data fields storing the time-based hierarchical information, as opposed to searching through the parent data object table 305-*a* for the data object and additionally searching through the child data object table 305-*b* for child data objects related to the data object. Even if the data object includes a pointer to each of its child data objects (which is not the case in some database systems), retrieving the time-based hierarchical information from these indicated child data objects may involve a non-trivial processing time as compared to retrieving the time-based hierarchical information from data fields at the identified data object. The data object transformation technique 300 may support a single database system (e.g., an OLTP database) for both planning and managing transactions.

For example, the data object transformation technique 300 may allow a database system to store the customer-product-week information described herein with 500,000 records, as compared to 26,000,000 records. For example, because the weekly volume information may be stored as columns at the product-level, rather than as child records below the product-level in the database hierarchy, the database may reduce the number of data records to store by approximately a factor of 54. Rolling up the time-based information into a higher level of the hierarchy may be supported based on the time-based information corresponding to a discrete number of subsets (e.g., 54, corresponding to weeks in a year; 12, corresponding to months in a year; 31, corresponding to days in a month; etc.). Hard-coding the number of fields supporting time-based hierarchical data may limit the available granularities for analyzing time-based information (e.g., to fifty-four discrete time periods). However, the efficiencies gained by significantly reducing the number of data records in the database (e.g., by a factor of fifty-four) may, in some cases, justify the tradeoff in supported granularities. In contrast, rolling up other hierarchical information may significantly reduce the adaptability of the system. For example, further rolling up the product information into the customer-level of the hierarchy may fail to support a dynamic number of products per customer. By storing the product information as child data records, the database system may add any number of child data records to store information for any number of additional products; if this information is stored as data fields at a customer data object, the number of data fields may limit the number of products supported per customer. Accordingly, the database supporting the second set of data objects 340-*b* may store data in a hybrid hierarchical structure in which the data objects in the data object table 305-*c* may correspond to the lowest level in the data hierarchy. Other levels of the hierarchy may include an account hierarchy (e.g., based on types of stores for an account, geographic regions, specific stores for an account, etc.), a product hierarchy (e.g., at the stock keeping unit (SKU) level), or some combination of these or additional hierarchy levels. By storing some specific types of hierarchical data in parent-child relationships and storing other specific types of hierarchical data together at a single data record, as described herein based on aspects of the hierarchical data types, the database may support both the analytics benefits of a hierarchical data model and the transactional benefits of storing a reduced number of data records in a database.

In some cases, the data object transformation technique 300 may illustrate transforming data from an initial data model design (e.g., represented by the first set of data objects 340-*a*) into an updated data model design (e.g., represented by the second set of data objects 340-*b*). For example, data from an OLAP database stored according to the initial data model design may be migrated and transformed for storage in an OLTP database according to the updated data model design. Additionally or alternatively, an OLTP database may initially store data according to the initial data model design (e.g., using one or more temporary tables) and may update the configuration to store the data according to the updated data model design (e.g., to reduce the number of data records stored in the OLTP database) and delete one or more temporary tables (e.g., the child data object table 305-*b*). In some other cases, a database (e.g., an OLTP database) may initially store data according to a data model design represented by the second set of data objects 340-*b*. For example, the database may be set up according to a data model design supporting low latency time-series volume planning and analysis, where the database additionally supports transactions.

Figure 4:
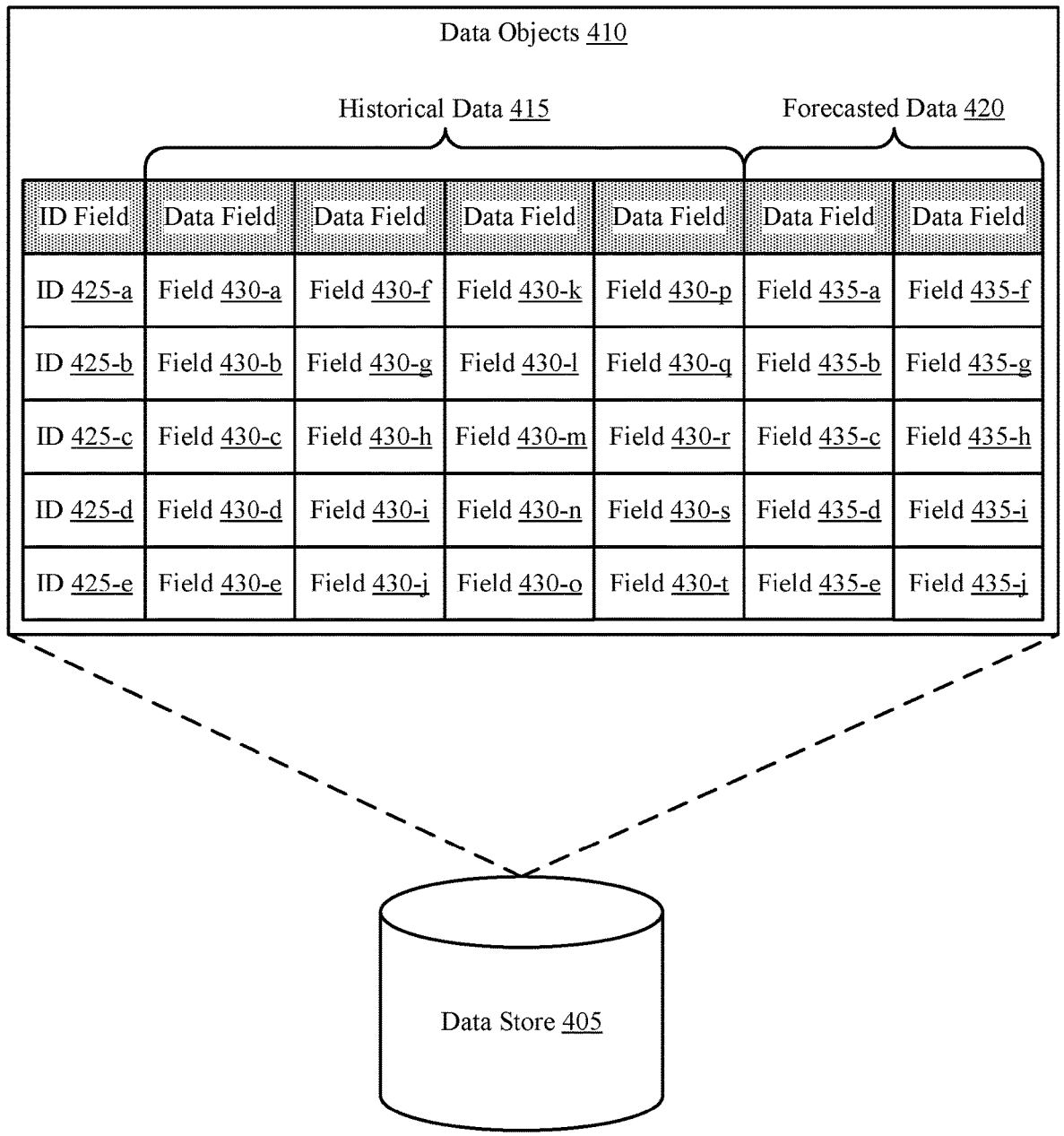
FIG. 4 illustrates an example of a data object storage technique that supports a data model design supporting low latency time-series volume planning and analysis in accordance with aspects of the present disclosure.

FIG. 4 illustrates an example of a data object storage technique 400 that supports a data model design supporting low latency time-series volume planning and analysis in accordance with aspects of the present disclosure. The data object storage technique 400 includes a data store 405 that may be an example or component of a data center 120 or an on-premise platform 145 as described with reference to FIG. 1. The data object storage technique 400 may implement time-series data analysis to support forecasting and predicting sales trends.

The data store 405 may contain a data object table 410 that stores historical data 415 and forecasted data 420 for a set of data objects that can be identified by unique identifiers 425 (e.g., primary keys, such as unique identifier 425-*a*, unique identifier 425-*b*, unique identifier 425-*c*, unique identifier 425-*d*, and unique identifier 425-*e*). The historical data 415 may include product information, financial information, sales information, accounting information, transactional information, or any combination thereof. The forecasted data 420 may be generated based on the historical data 415 and/or a number of parameters. As illustrated, a data object may include a number of columns related to time-based data. A column may be associated with a specific time period (e.g., a week of a year, a day of the week, etc.). Data fields 430 in the column corresponding to the current time period may be updated based on transactions occurring at the data store 405. For example, if a sale occurs, the sales numbers for the current time period may be updated based on the sale. Columns corresponding to time periods preceding the current time period may store historical data 415. Columns corresponding to time periods subsequent to the current time period may store forecasted data 420 (e.g., because sales information is not currently available for these future time periods).

In some cases, the historical data 415 may include transactional data related to a product or service. A user may indicate a time parameter and a discount parameter, and the forecasted data 420 may be generated based on the historical data 415, the time parameter, the discount parameter, or a combination thereof. The data object storage technique 400 may store the historical data 415 in a number of data objects that indicate a temporal hierarchy, thereby supporting the data store 405 in generating forecasted data in real-time or near real-time. As such, the data object storage technique 400 may support a user in efficiently forecasting various scenarios through efficient time-series analysis.

As a non-limiting example, a first group of data fields (e.g., data field 430-*a*, data field 430-*b*, data field 430-*c*, data field 430-*d*, and data field 430-*e*) may correspond to a product type, a second group of data fields (e.g., data field 430-*f*, data field 430-*g*, data field 430-*h*, data field 430-*i*, and data field 430-*j*) may correspond to product price, and a third group of data fields (e.g., data field 430-*k*, data field 430-*l*, data field 430-*m*, data field 430-*n*, data field 430-*o*, data field 430-*p*, data field 430-*q*, data field 430-*r*, data field 430-*s*, and data field 430-*t*) may correspond to a temporal hierarchy associated with revenue. For example, unique identifier 425-*a* may identify a first data object, data field 430-*a* may correspond to a shoe product, data field 430-*f* may correspond to a price of the shoe, data field 430-*k* may correspond to revenue for the first month of a year, and data field 430-*p* may correspond to revenue for the second month of the year. The data store 405 may receive a query from a user indicating a prediction parameter (e.g., expected revenue) a product parameter (e.g., a type of shoe), a time parameter (e.g., the next two months), a discount parameters (e.g., a shoe discount of 30%), or some combination thereof, and the data store 405 may generate the forecasted data 420 based on the prediction parameter, the product parameter, the time parameter, the discount parameter, the first group of data fields, the second group of data fields, the third group of data fields, or a combination thereof. The data store 405 may generate the forecasted data 420 based on the query, and data field 435-a may correspond to expected revenue during the next month and data field 435-f may correspond to expected revenue during the month after next. Similarly, forecasted data may be forecasted for data field 435-b, data field 435-g, data field 435-c, data field 435-h, data field 435-d, data field 435-i, data field 435-e, data field 435-j, or some combination thereof. As the scope and complexity of such forecasts expands, the data model, as illustrated in FIG. 4, may significantly simplify the number of queries and processing resources involved in performing the forecasts (e.g., as compared to a data model that distributes the forecasted data 420 across a number of child data objects).

As such, a single forecasting query may result in writing to a significant volume of data fields in the data store 405 (e.g., based on the number of product data objects affected by the forecasting query). However, by storing the historical data 415 and the forecasted data 420 in data fields at the product data objects, rather than in child data objects corresponding to different time segments (e.g., months, weeks, days, etc.) in a hierarchy layer below the product data objects, the data store 405 may significantly reduce the number of data objects affected by a single forecasting query. It should be understood that the data object storage technique 400 is an illustrative example and additional data fields may be added or removed.

The design of the data model configured for the data store 405 may involve query modifications at the data store 405. For example, a user device may transmit a query to the data store 405 requesting information for a specific time period. While the query may indicate the time period using dates, times, or timestamps, the data store 405 may store the information in data fields with no inherent mapping to a specific time period. As such, the data store 405 may automatically convert the query parameters to operate on the data object table 410. For example, in the examples described above, the query may indicate to return forecasted information for March and April. The data store 405, based on the configuration of the data object table 410, a current timestamp, relationships defined by a system administrator, or any combination thereof, may determine that "April" corresponds to a specific column—or set of columns—in the data object table 410, while "May" corresponds to another specific column or set of columns. As such, the data store 405 may convert the query parameters to operate on specific columns in the data store 405 from the more abstract concepts of months, weeks, days, etc. A similar conversion may be applied when updating data based on ongoing transactions. For example, each transaction may correspond to a specific time period (e.g., based on a captured timestamp for the transaction), and the data store 405 may update historical data 415 for the specific time period based on the transaction.

In some cases, rather than storing the time-based hierarchical data in different data fields in the data object table 410, the data store 405 may store the time-based hierarchical data in an array field or a JavaScript object notation (JSON) field. For example, rather than storing fifty-four data fields to represent fifty-four time periods, the data store 405 may store an array field with fifty-four indexes to represent the fifty-four time periods of a JSON field including an indication of fifty-four values representing the fifty-four time periods. Additionally or alternatively, the data associated with the fifty-four time periods may be stored in a single JSON field, where each value is stored using a specific number of characters, such that the fifty-four values may be parsed based on known start and end character locations for the values within a String. Such configurations may reduce a number of columns in a data object table 410 of the data store 405.

Figure 5:
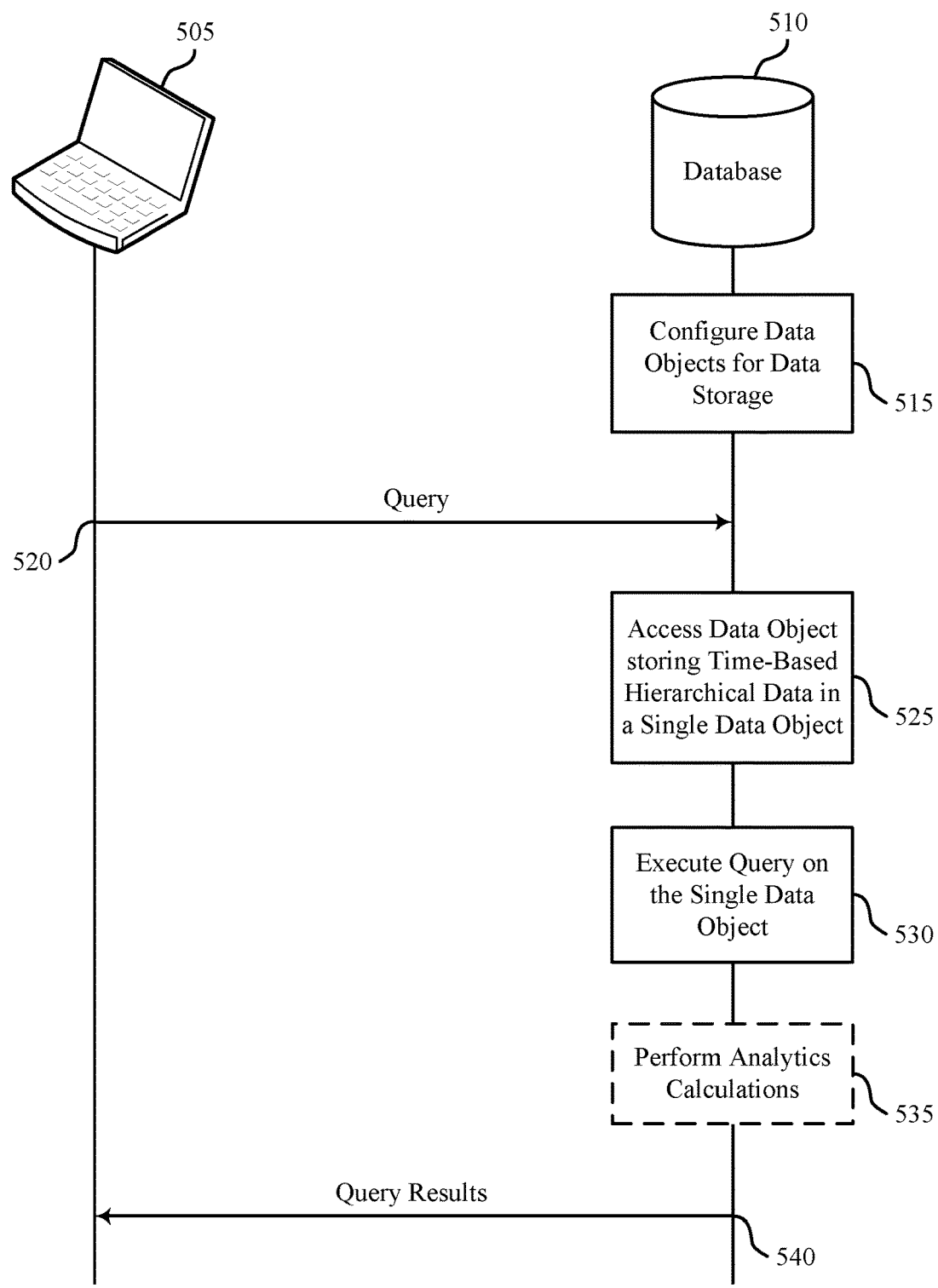
FIG. 5 illustrates an example of a process flow that supports a data model design supporting low latency time-series volume planning and analysis in accordance with aspects of the present disclosure.

FIG. 5 illustrates an example of a process flow 500 that supports a data model design supporting low latency time-series volume planning and analysis in accordance with aspects of the present disclosure. The process flow 500 includes a user device 505 and a database 510 (e.g., an OLTP database). These may be examples of the corresponding devices described with reference to FIGS. 1 through 4. The database 510 may implement time-series analysis to support sales forecasting at the user device 505. Alternative examples of the following may be implemented, where some steps are performed in a different order than described or are not performed at all. In some cases, steps may include additional features not mentioned below, or further steps may be added.

At 515, the database 510 may be configured (e.g., by a database server, a system administrator, or some supported configuration process) with a data model for storing data. The data model may include a set of parent data objects at the database 510 to store a first set of object-specific data for the set of parent data objects and set of child data objects to store a first set of hierarchical data for the set of parent data objects. A child data object may include a respective set of data fields storing a subset of the first set of hierarchical data (e.g., the subset may include hierarchical data for a particular product, a particular sub-division of an account, etc.), a respective unique identifier (e.g., a primary key) for the child data object, and a relationship indicator (e.g., a foreign key) indicating a parent data object of the set of parent data objects.

The data model may further include a data object that stores a first set of data fields including a second set of object-specific data for the data object and a second set of data fields storing a second set of hierarchical data for the data object. A data field of the second set of data fields may store a subset of the second set of hierarchical data according to a temporal hierarchy (e.g., relative segmentations in the time domain, such as weeks in a year) defining the second set of data fields, and the data object may include a unique identifier that supports querying the data object in the database 510. In some examples, the data object storing the temporal hierarchical data may be at a lowest level of a hierarchy in the data model.

At 520, the database 510 may receive a query from the user device 505, and the query may indicate a time period for analysis. In some cases, the time period may be a contiguous period of time, while in some other cases, the time period may include one or more non-contiguous sections of time. At 525, the database 510 may access the data object based on the query and the unique identifier that supports querying the data object. For example, the database 510 may access a single data object that stores time-based hierarchical data (e.g., in a set of data fields).

At 530, the database 510 may execute the query on the data object. In some cases, the query may be executed on at least a portion of the second set of data fields based on the indicated time period and the temporal hierarchy. In some examples, at 535, the database 510 may perform one or more calculations based on the query and the data fields. For example, the calculations may involve forecasting operations, analytics operations, formulas, or any combination thereof. At 540, the database 510 may send query results to the user device 505 in response to executing the query. For example, the query results may include sales forecasting information based on executing analysis on one or more of the second set of data fields storing hierarchical data according to the temporal hierarchy.

In some cases, the database 510 may receive an additional query for a higher layer in the hierarchical structure of the database 510. For example, the additional query may request information stored at a parent data object (e.g., an account, where the account is related to a number of child data objects corresponding to products of the account). In some cases, the database 510 may roll up data from the product data objects to determine query results related to one or more account data objects. As such, accessing product-level hierarchical data for an account may be handled differently at the database 510 than accessing time-level hierarchical data for a product based on the data model design of the database 510. Such a data model may support dynamic growth at the product-level of the hierarchy while supporting efficient querying at the time-level of the hierarchy.

Figure 6:
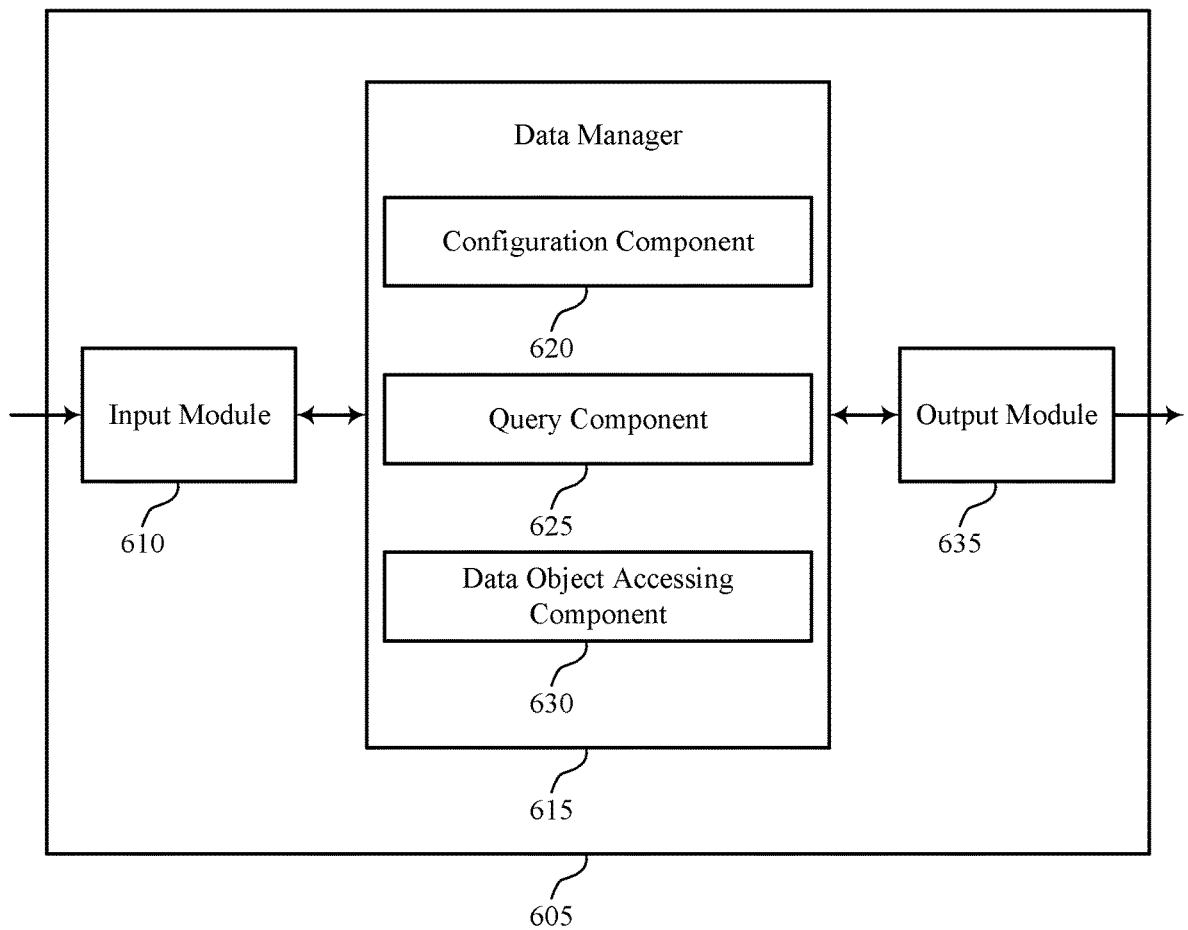
FIG. 6 shows a block diagram of an apparatus that supports a data model design supporting low latency time-series volume planning and analysis in accordance with aspects of the present disclosure.

FIG. 6 shows a block diagram 600 of an apparatus 605 that supports a data model design supporting low latency time-series volume planning and analysis in accordance with aspects of the present disclosure. The apparatus 605 may include an input module 610, a data manager 615, and an output module 635. The apparatus 605 may also include a processor. Each of these components may be in communication with one another (e.g., via one or more buses). In some cases, the apparatus 605 may be an example of a user terminal, a database server, or a system containing multiple computing devices.

The input module 610 may manage input signals for the apparatus 605. For example, the input module 610 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 610 may send aspects of these input signals to other components of the apparatus 605 for processing. For example, the input module 610 may transmit input signals to the data manager 615 to support a data model design supporting low latency time-series volume planning and analysis. In some cases, the input module 610 may be a component of an input/output (I/O) controller 815 as described with reference to FIG. 8.

The data manager 615 may include a configuration component 620, a query component 625, and a data object accessing component 630. The data manager 615 may be an example of aspects of the data manager 705 or 810 described with reference to FIGS. 7 and 8. The data manager 615 may support storing and querying hierarchical data at an OLTP database.

The data manager 615 and/or at least some of its various sub-components may be implemented in hardware, software executed by a processor, firmware, or any combination thereof. If implemented in software executed by a processor, the functions of the data manager 615 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The data manager 615 and/or at least some of its various sub-components may be physically located at various positions, including being distributed such that portions of functions are implemented at different physical locations by one or more physical devices. In some examples, the data manager 615 and/or at least some of its various sub-components may be a separate and distinct component in accordance with various aspects of the present disclosure. In other examples, the data manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The configuration component 620 may configure a set of parent data objects to store a first set of object-specific data for the set of parent data objects and a set of child data objects to store a first set of hierarchical data for the set of parent data objects, where a child data object includes a respective set of data fields storing a subset of the first set of hierarchical data, a respective unique identifier for the child data object, and a relationship indicator indicating a parent data object of the set of parent data objects. The configuration component 620 may further configure a data object to store a first set of data fields including a second set of object-specific data for the data object and a second set of data fields storing a second set of hierarchical data for the data object, where a data field of the second set of data fields stores a subset of the second set of hierarchical data according to a temporal hierarchy defining the second set of data fields, and the data object includes a unique identifier that supports querying the data object in the OLTP database.

The query component 625 may receive a query indicating a time period for data analysis. The data object accessing component 630 may access, in the OLTP database, the data object based on the query and the unique identifier that supports querying the data object. The query component 625 may execute the query on the data object, where the query is executed on at least a portion of the second set of data fields based on the indicated time period and the temporal hierarchy.

The output module 635 may manage output signals for the apparatus 605. For example, the output module 635 may receive signals from other components of the apparatus 605, such as the data manager 615, and may transmit these signals to other components or devices. In some specific examples, the output module 635 may transmit output signals for display in a user interface, for storage in a database or data store, for further processing at a server or server cluster, or for any other processes at any number of devices or systems. In some cases, the output module 635 may be a component of an I/O controller 815 as described with reference to FIG. 8.

Figure 7:
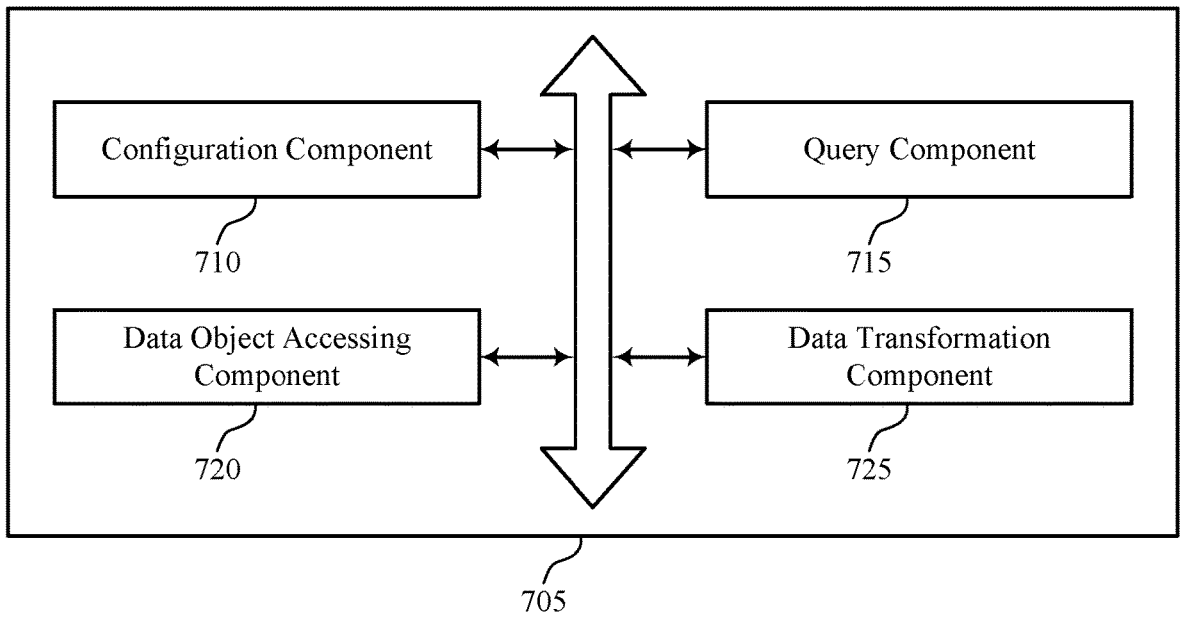
FIG. 7 shows a block diagram of a data manager that supports a data model design supporting low latency time-series volume planning and analysis in accordance with aspects of the present disclosure.

FIG. 7 shows a block diagram 700 of a data manager 705 that supports a data model design supporting low latency time-series volume planning and analysis in accordance with aspects of the present disclosure. The data manager 705 may be an example of aspects of a data manager 615 or a data manager 810 described herein. The data manager 705 may include a configuration component 710, a query component 715, a data object accessing component 720, and a data transformation component 725. Each of these components may communicate, directly or indirectly, with one another (e.g., via one or more buses). The data manager 705 may be implemented in a database system, such as an OLTP database.

The configuration component 710 may configure a set of parent data objects to store a first set of object-specific data for the set of parent data objects and a set of child data objects to store a first set of hierarchical data for the set of parent data objects, where a child data object includes a respective set of data fields storing a subset of the first set of hierarchical data, a respective unique identifier for the child data object, and a relationship indicator indicating a parent data object of the set of parent data objects.

The configuration component 710 may further configure a data object to store a first set of data fields including a second set of object-specific data for the data object and a second set of data fields storing a second set of hierarchical data for the data object, where a data field of the second set of data fields stores a subset of the second set of hierarchical data according to a temporal hierarchy defining the second set of data fields, and the data object includes a unique identifier that supports querying the data object in the OLTP database.

In some cases, the temporal hierarchy defining the second set of data fields defines a number of time segments, where a first set of time segments corresponds to historical data, a time segment corresponds to a current time segment, and a second set of time segments corresponds to forecasted data. In some cases, the number of time segments includes fifty-four time segments. In some cases, the second set of hierarchical data is stored as an array, a JSON field, a field of concatenated fixed character length values, or a combination thereof.

The query component 715 may receive a query indicating a time period for data analysis. The data object accessing component 720 may access, in the OLTP database, the data object based on the query and the unique identifier that supports querying the data object. The query component 715 may execute the query on the data object, where the query is executed on at least a portion of the second set of data fields based on the indicated time period and the temporal hierarchy.

In some examples, the query component 715 may receive an additional query indicating a parent data object of the set of parent data objects, where the data object includes a relationship indicator indicating the parent data object as a parent to the data object. In some such examples, the query component 715 may roll up, at query time for the additional query, data associated with the data object to a data field of the parent data object based on the additional query.

In some examples, the query component 715 may refrain from accessing a child data object of the data object to execute the query based on the data object storing the second set of data fields storing the second set of hierarchical data.

The data transformation component 725 may initially store the second set of hierarchical data in a second set of child data objects, each child data object of the second set of child data objects including one or more data fields corresponding to a specific time segment. In some examples, configuring the data object to store the second set of data fields storing the second set of hierarchical data further includes the data transformation component 725 transforming data from the second set of child data objects to the second set of data fields of the data object, where the data from the one or more data fields of each child data object of the second set of child data objects is stored in one or more data fields of the second set of data fields of the data object corresponding to a same time segment defined by the temporal hierarchy.

In some examples, the data transformation component 725 may delete the second set of child data objects from the OLTP database based on the transforming.

In some examples, the data transformation component 725 may update, in real-time, one or more data fields of the second set of data fields corresponding to the current time segment based on a transaction associated with the OLTP database.

In some examples, the query may further indicate a value for time-series volume planning, and executing the query may involve the query component 715 updating a value of a data field of the data object based on the indicated value for time-series volume planning and updating a set of values of at least a subset of the second set of data fields corresponding to the forecasted data based on the updated value and the historical data, where a result of the query is based on the updated set of values.

In some examples, the data transformation component 725 may store the data object as a row in a first table of the OLTP database and may store the first set of data fields and the second set of data fields as columns in the first table of the OLTP database. In some such examples, the data object accessing component 720 may search the first table for the data object according to the unique identifier that supports querying the data object and may refrain from searching a second table based on the data object storing the second set of data fields storing the second set of hierarchical data.

Figure 8:
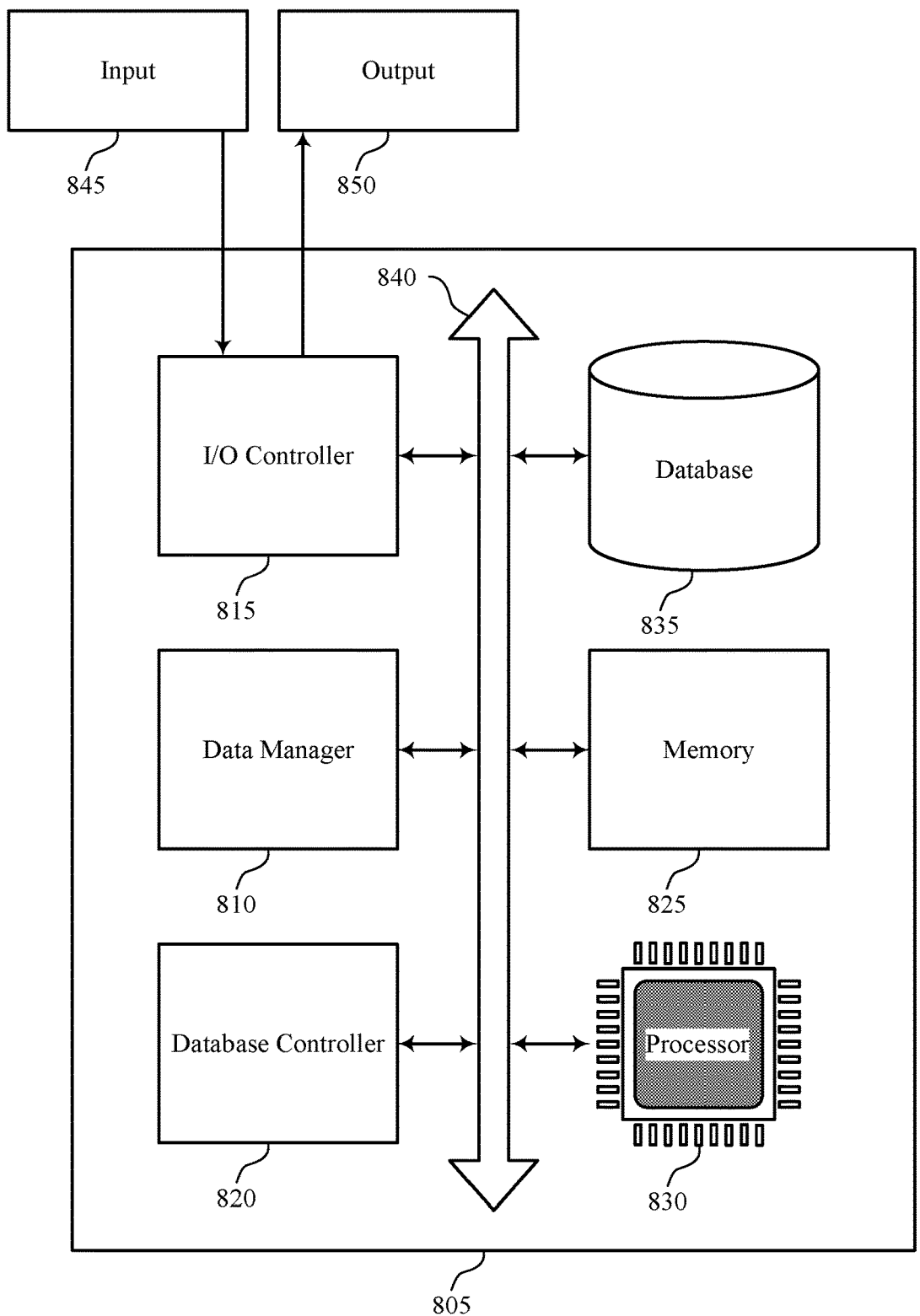
FIG. 8 shows a diagram of a system including a device that supports a data model design supporting low latency time-series volume planning and analysis in accordance with aspects of the present disclosure.

FIG. 8 shows a diagram of a system 800 including a device 805 that supports a data model design supporting low latency time-series volume planning and analysis in accordance with aspects of the present disclosure. The device 805 may be an example of or include the components of a server or an apparatus 605 as described herein. The device 805 may include components for bi-directional data communications including components for transmitting and receiving communications, including a data manager 810, an I/O controller 815, a database controller 820, memory 825, a processor 830, and a database 835. These components may be in electronic communication via one or more buses (e.g., bus 840).

The data manager 810 may be an example of a data manager 615 or 705 as described herein. For example, the data manager 810 may perform any of the methods or processes described above with reference to FIGS. 6 and 7. In some cases, the data manager 810 may be implemented in hardware, software executed by a processor, firmware, or any combination thereof.

The I/O controller 815 may manage input signals 845 and output signals 850 for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The database controller 820 may manage data storage and processing in a database 835. In some cases, a user may interact with the database controller 820. In other cases, the database controller 820 may operate automatically without user interaction. The database 835 may be an example of a single database, a distributed database, multiple distributed databases, a data store, a data lake, or an emergency backup database.

Memory 825 may include random-access memory (RAM) and read-only memory (ROM). The memory 825 may store computer-readable, computer-executable software including instructions that, when executed, cause the processor to perform various functions described herein. In some cases, the memory 825 may contain, among other things, a basic I/O system (BIOS) which may control basic hardware or software operation such as the interaction with peripheral components or devices.

The processor 830 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 830 may be configured to operate a memory array using a memory controller. In other cases, a memory controller may be integrated into the processor 830. The processor 830 may be configured to execute computer-readable instructions stored in a memory 825 to perform various functions (e.g., functions or tasks supporting a data model design supporting low latency time-series volume planning and analysis).

Figure 9:
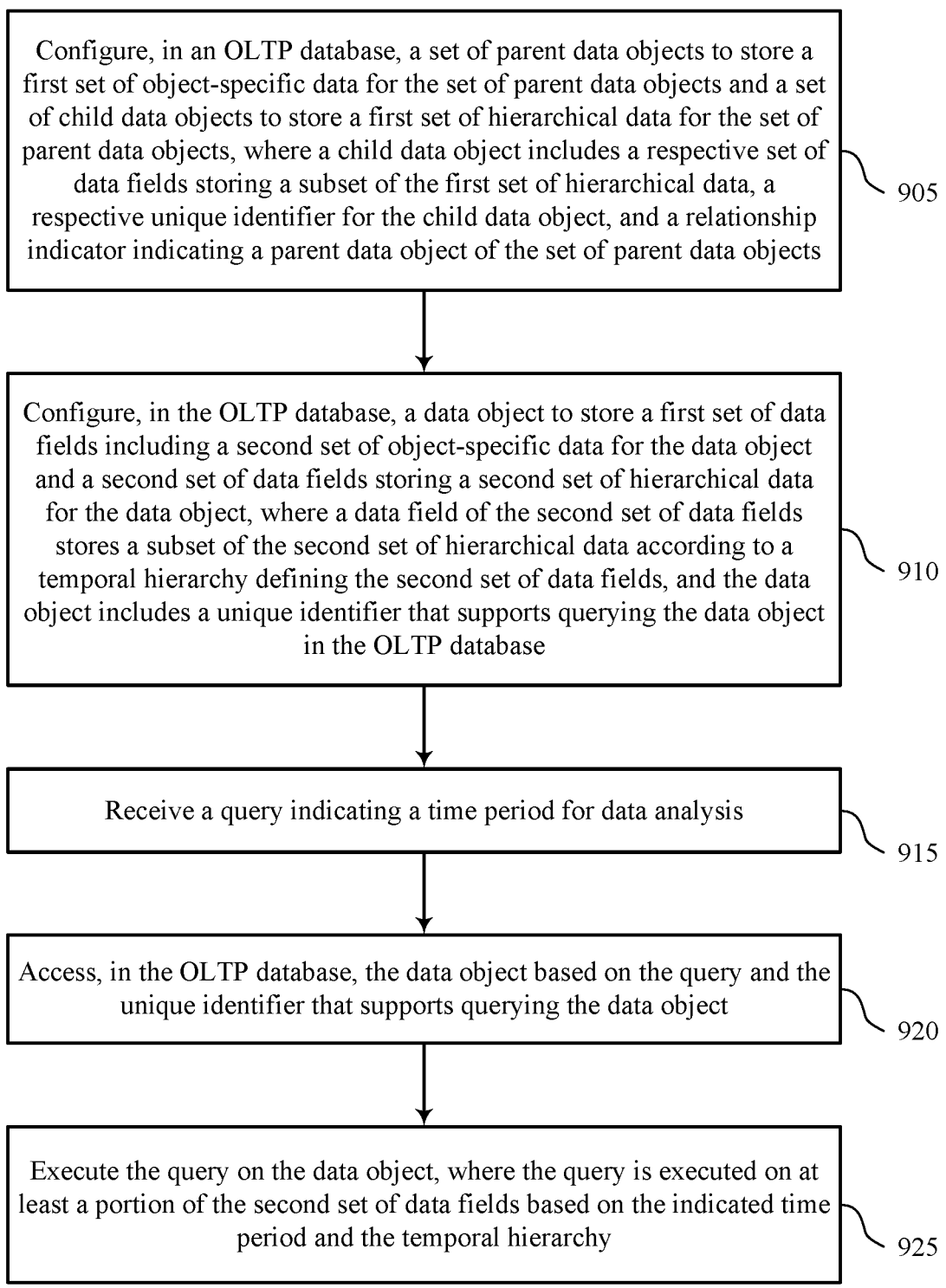
FIGS. 9 and 10 show flowcharts illustrating methods that support a data model design supporting low latency time-series volume planning and analysis in accordance with aspects of the present disclosure.

FIG. 9 shows a flowchart illustrating a method 900 that supports a data model design supporting low latency time-series volume planning and analysis in accordance with aspects of the present disclosure. The operations of method 900 may be implemented by a server (e.g., a database server, an application server, a cloud-based server, a server cluster, a virtual machine, or another device or system supporting configuration of a database, such as an OLTP database) or its components as described herein. For example, the operations of method 900 may be performed by a data manager as described with reference to FIGS. 6 through 8. In some examples, a server may execute a set of instructions to control the functional elements of the application server to perform the functions described below. Additionally or alternatively, a server may perform aspects of the functions described below using special-purpose hardware.

At 905, the server may configure a set of parent data objects to store a first set of object-specific data for the set of parent data objects and a set of child data objects to store a first set of hierarchical data for the set of parent data objects, where a child data object includes a respective set of data fields storing a subset of the first set of hierarchical data, a respective unique identifier for the child data object, and a relationship indicator indicating a parent data object of the set of parent data objects. The operations of 905 may be performed according to the methods described herein. In some examples, aspects of the operations of 905 may be performed by a configuration component as described with reference to FIGS. 6 through 8.

At 910, the server may configure a data object to store a first set of data fields including a second set of object-specific data for the data object and a second set of data fields storing a second set of hierarchical data for the data object, where a data field of the second set of data fields stores a subset of the second set of hierarchical data according to a temporal hierarchy defining the second set of data fields, and the data object includes a unique identifier that supports querying the data object in the OLTP database. The operations of 910 may be performed according to the methods described herein. In some examples, aspects of the operations of 910 may be performed by a configuration component as described with reference to FIGS. 6 through 8.

At 915, the server may receive a query indicating a time period for data analysis. The operations of 915 may be performed according to the methods described herein. In some examples, aspects of the operations of 915 may be performed by a query component as described with reference to FIGS. 6 through 8.

At 920, the server may access, in the OLTP database, the data object based on the query and the unique identifier that supports querying the data object. The operations of 920 may be performed according to the methods described herein. In some examples, aspects of the operations of 920 may be performed by a data object accessing component as described with reference to FIGS. 6 through 8.

At 925, the application server may execute the query on the data object, where the query is executed on at least a portion of the second set of data fields based on the indicated time period and the temporal hierarchy. The operations of 925 may be performed according to the methods described herein. In some examples, aspects of the operations of 925 may be performed by a query component as described with reference to FIGS. 6 through 8.

Figure 10:
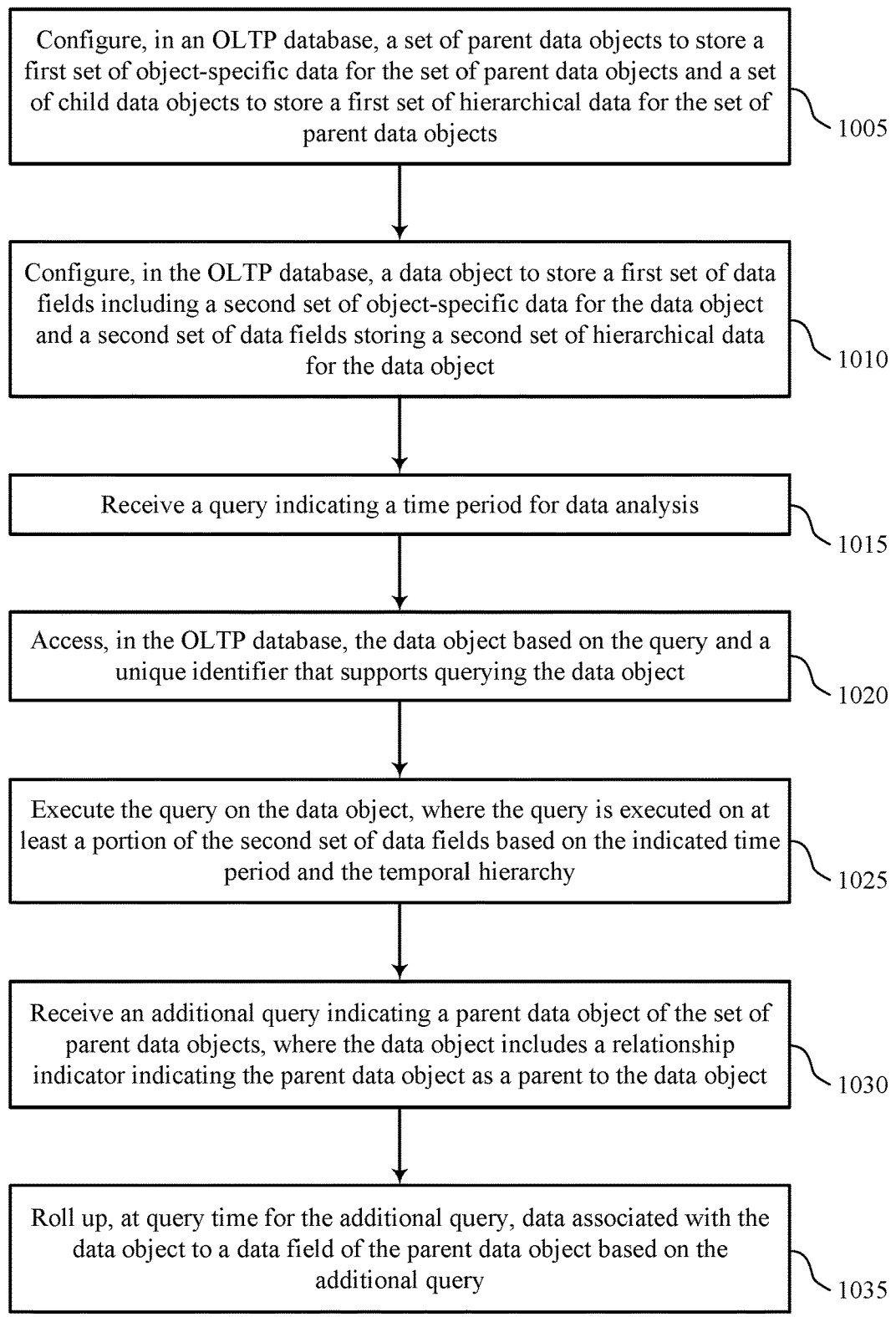

FIG. 10 shows a flowchart illustrating a method 1000 that supports a data model design supporting low latency time-series volume planning and analysis in accordance with aspects of the present disclosure. The operations of method 1000 may be implemented by a server or its components as described herein. For example, the operations of method 1000 may be performed by a data manager as described with reference to FIGS. 6 through 8. In some examples, a server may execute a set of instructions to control the functional elements of the application server to perform the functions described below. Additionally or alternatively, a server may perform aspects of the functions described below using special-purpose hardware.

At 1005, the server (e.g., at an OLTP database) may configure a set of parent data objects to store a first set of object-specific data for the set of parent data objects and a set of child data objects to store a first set of hierarchical data for the set of parent data objects, where a child data object includes a respective set of data fields storing a subset of the first set of hierarchical data, a respective unique identifier for the child data object, and a relationship indicator indicating a parent data object of the set of parent data objects. The operations of 1005 may be performed according to the methods described herein. In some examples, aspects of the operations of 1005 may be performed by a configuration component as described with reference to FIGS. 6 through 8.

At 1010, the server may configure a data object to store a first set of data fields including a second set of object-specific data for the data object and a second set of data fields storing a second set of hierarchical data for the data object, where a data field of the second set of data fields stores a subset of the second set of hierarchical data according to a temporal hierarchy defining the second set of data fields, and the data object includes a unique identifier that supports querying the data object in the OLTP database. The operations of 1010 may be performed according to the methods described herein. In some examples, aspects of the operations of 1010 may be performed by a configuration component as described with reference to FIGS. 6 through 8.

At 1015, the server may receive a query indicating a time period for data analysis. The operations of 1015 may be performed according to the methods described herein. In some examples, aspects of the operations of 1015 may be performed by a query component as described with reference to FIGS. 6 through 8.

At 1020, the server may access, in the OLTP database, the data object based on the query and the unique identifier that supports querying the data object. The operations of 1020 may be performed according to the methods described herein. In some examples, aspects of the operations of 1020 may be performed by a data object accessing component as described with reference to FIGS. 6 through 8.

At 1025, the server may execute the query on the data object, where the query is executed on at least a portion of the second set of data fields based on the indicated time period and the temporal hierarchy. The operations of 1025 may be performed according to the methods described herein. In some examples, aspects of the operations of 1025 may be performed by a query component as described with reference to FIGS. 6 through 8.

At 1030, the server may receive an additional query indicating a parent data object of the set of parent data objects, where the data object includes a relationship indicator indicating the parent data object as a parent to the data object. The operations of 1030 may be performed according to the methods described herein. In some examples, aspects of the operations of 1030 may be performed by a query component as described with reference to FIGS. 6 through 8.

At 1035, the server may roll up, at query time for the additional query, data associated with the data object to a data field of the parent data object based on the additional query. The operations of 1035 may be performed according to the methods described herein. In some examples, aspects of the operations of 1035 may be performed by a query component as described with reference to FIGS. 6 through 8.

A method for storing and querying hierarchical data in an OLTP database is described. The method may include configuring a set of parent data objects to store a first set of object-specific data for the set of parent data objects and a set of child data objects to store a first set of hierarchical data for the set of parent data objects, where a child data object includes a respective set of data fields storing a subset of the first set of hierarchical data, a respective unique identifier for the child data object, and a relationship indicator indicating a parent data object of the set of parent data objects. The method may further include configuring a data object to store a first set of data fields including a second set of object-specific data for the data object and a second set of data fields storing a second set of hierarchical data for the data object, where a data field of the second set of data fields stores a subset of the second set of hierarchical data according to a temporal hierarchy defining the second set of data fields, and the data object includes a unique identifier that supports querying the data object in the OLTP database. The method may further include receiving a query indicating a time period for data analysis, accessing, in the OLTP database, the data object based on the query and the unique identifier that supports querying the data object, and executing the query on the data object, where the query is executed on at least a portion of the second set of data fields based on the indicated time period and the temporal hierarchy.

An apparatus for storing and querying hierarchical data in an OLTP database is described. The apparatus may include a processor, memory coupled with the processor, and instructions stored in the memory. The instructions may be executable by the processor to cause the apparatus to configure a set of parent data objects to store a first set of object-specific data for the set of parent data objects and a set of child data objects to store a first set of hierarchical data for the set of parent data objects, where a child data object includes a respective set of data fields storing a subset of the first set of hierarchical data, a respective unique identifier for the child data object, and a relationship indicator indicating a parent data object of the set of parent data objects. The instructions may be further executable by the processor to cause the apparatus to configure a data object to store a first set of data fields including a second set of object-specific data for the data object and a second set of data fields storing a second set of hierarchical data for the data object, where a data field of the second set of data fields stores a subset of the second set of hierarchical data according to a temporal hierarchy defining the second set of data fields, and the data object includes a unique identifier that supports querying the data object in the OLTP database. The instructions may be further executable by the processor to cause the apparatus to receive a query indicating a time period for data analysis, access, in the OLTP database, the data object based on the query and the unique identifier that supports querying the data object, and execute the query on the data object, where the query is executed on at least a portion of the second set of data fields based on the indicated time period and the temporal hierarchy.

Another apparatus for storing and querying hierarchical data in an OLTP database is described. The apparatus may include means for configuring a set of parent data objects to store a first set of object-specific data for the set of parent data objects and a set of child data objects to store a first set of hierarchical data for the set of parent data objects, where a child data object includes a respective set of data fields storing a subset of the first set of hierarchical data, a respective unique identifier for the child data object, and a relationship indicator indicating a parent data object of the set of parent data objects. The apparatus may further include means for configuring a data object to store a first set of data fields including a second set of object-specific data for the data object and a second set of data fields storing a second set of hierarchical data for the data object, where a data field of the second set of data fields stores a subset of the second set of hierarchical data according to a temporal hierarchy defining the second set of data fields, and the data object includes a unique identifier that supports querying the data object in the OLTP database. The apparatus may further include means for receiving a query indicating a time period for data analysis, means for accessing, in the OLTP database, the data object based on the query and the unique identifier that supports querying the data object, and means for executing the query on the data object, where the query is executed on at least a portion of the second set of data fields based on the indicated time period and the temporal hierarchy.

A non-transitory computer-readable medium storing code for storing and querying hierarchical data in an OLTP database is described. The code may include instructions executable by a processor to configure a set of parent data objects to store a first set of object-specific data for the set of parent data objects and a set of child data objects to store a first set of hierarchical data for the set of parent data objects, where a child data object includes a respective set of data fields storing a subset of the first set of hierarchical data, a respective unique identifier for the child data object, and a relationship indicator indicating a parent data object of the set of parent data objects. The code may further include instructions executable by the processor to configure a data object to store a first set of data fields including a second set of object-specific data for the data object and a second set of data fields storing a second set of hierarchical data for the data object, where a data field of the second set of data fields stores a subset of the second set of hierarchical data according to a temporal hierarchy defining the second set of data fields, and the data object includes a unique identifier that supports querying the data object in the OLTP database. The code may further include instructions executable by the processor to receive a query indicating a time period for data analysis, access, in the OLTP database, the data object based on the query and the unique identifier that supports querying the data object, and execute the query on the data object, where the query is executed on at least a portion of the second set of data fields based on the indicated time period and the temporal hierarchy.

Some examples of the method, apparatuses, and non-transitory computer-readable medium described herein may further include operations, features, means, or instructions for receiving an additional query indicating a first parent data object of the set of parent data objects, where the data object includes a first relationship indicator indicating the first parent data object as a parent to the data object, and rolling up, at query time for the additional query, data associated with the data object to a data field of the first parent data object based on the additional query.

Some examples of the method, apparatuses, and non-transitory computer-readable medium described herein may further include operations, features, means, or instructions for refraining from accessing a child data object of the data object to execute the query based on the data object storing the second set of data fields storing the second set of hierarchical data.

Some examples of the method, apparatuses, and non-transitory computer-readable medium described herein may further include operations, features, means, or instructions for initially storing the second set of hierarchical data in a second set of child data objects, each child data object of the second set of child data objects including one or more data fields corresponding to a specific time segment, where configuring the data object to store the second set of data fields storing the second set of hierarchical data further includes operations, features, means, or instructions for transforming data from the second set of child data objects to the second set of data fields of the data object, where the data from the one or more data fields of each child data object of the second set of child data objects may be stored in one or more data fields of the second set of data fields of the data object corresponding to a same time segment defined by the temporal hierarchy.

Some examples of the method, apparatuses, and non-transitory computer-readable medium described herein may further include operations, features, means, or instructions for deleting the second set of child data objects from the OLTP database based on the transforming.

In some examples of the method, apparatuses, and non-transitory computer-readable medium described herein, the temporal hierarchy defining the second set of data fields defines a number of time segments, where a first set of time segments corresponds to historical data, a time segment corresponds to a current time segment, and a second set of time segments corresponds to forecasted data.

Some examples of the method, apparatuses, and non-transitory computer-readable medium described herein may further include operations, features, means, or instructions for updating, in real-time, one or more data fields of the second set of data fields corresponding to the current time segment based on a transaction associated with the OLTP database.

In some examples of the method, apparatuses, and non-transitory computer-readable medium described herein, the query further indicates a value for time-series volume planning and where executing the query further may include operations, features, means, or instructions for updating a value of a data field of the data object based on the indicated value for time-series volume planning and updating a set of values of at least a subset of the second set of data fields corresponding to the forecasted data based on the updated value and the historical data, where a result of the query may be based on the updated set of values.

In some examples of the method, apparatuses, and non-transitory computer-readable medium described herein, the number of time segments includes fifty-four time segments.

Some examples of the method, apparatuses, and non-transitory computer-readable medium described herein may further include operations, features, means, or instructions for storing the data object as a row in a first table of the OLTP database and storing the first set of data fields and the second set of data fields as columns in the first table of the OLTP database.

In some examples of the method, apparatuses, and non-transitory computer-readable medium described herein, accessing, in the OLTP database, the data object may include operations, features, means, or instructions for searching the first table for the data object according to the unique identifier that supports querying the data object and refraining from searching a second table based on the data object storing the second set of data fields storing the second set of hierarchical data.

In some examples of the method, apparatuses, and non-transitory computer-readable medium described herein, the second set of hierarchical data may be stored as an array, a JSON field, a field of concatenated values of fixed length, or a combination thereof.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for storing and querying hierarchical data in an online transactional processing (OLTP) database, comprising:
   configuring a plurality of parent data objects to store a first set of object-specific data for the plurality of parent data objects and a plurality of child data objects to store a first set of hierarchical data for the plurality of parent data objects, wherein a child data object comprises:
      a respective set of data fields storing a subset of the first set of hierarchical data,
      a respective unique identifier for the child data object, and
      a relationship indicator indicating a parent data object of the plurality of parent data objects;
   configuring a data object to store a first set of data fields comprising a second set of object-specific data for the data object and a second set of data fields storing a second set of hierarchical data for the data object, wherein:
      a data field of the second set of data fields stores a subset of the second set of hierarchical data according to a temporal hierarchy defining the second set of data fields, and
      the data object comprises a unique identifier that supports querying the data object in the OLTP database;
   receiving a query indicating a time period for data analysis;
   accessing, in the OLTP database, the data object based at least in part on the query and the unique identifier that supports querying the data object; and
   executing the query on the data object, wherein the query is executed on at least a portion of the second set of data fields based at least in part on the indicated time period and the temporal hierarchy.

2. The method of claim 1, further comprising:
   receiving an additional query indicating a first parent data object of the plurality of parent data objects, wherein the data object comprises a first relationship indicator indicating the first parent data object as a parent to the data object; and rolling up, at query time for the additional query, data associated with the data object to a data field of the first parent data object based at least in part on the additional query.

3. The method of claim 1, further comprising:
refraining from accessing a child data object of the data object to execute the query based at least in part on the data object storing the second set of data fields storing the second set of hierarchical data.

4. The method of claim 1, further comprising:
initially storing the second set of hierarchical data in a second plurality of child data objects, each child data object of the second plurality of child data objects comprising one or more data fields corresponding to a specific time segment, wherein configuring the data object to store the second set of data fields storing the second set of hierarchical data further comprises:
transforming data from the second plurality of child data objects to the second set of data fields of the data object, wherein the data from the one or more data fields of each child data object of the second plurality of child data objects is stored in one or more data fields of the second set of data fields of the data object corresponding to a same time segment defined by the temporal hierarchy.

5. The method of claim 4, further comprising:
deleting the second plurality of child data objects from the OLTP database based at least in part on the transforming.

6. The method of claim 1, wherein the temporal hierarchy defining the second set of data fields defines a number of time segments, wherein a first set of time segments corresponds to historical data, a time segment corresponds to a current time segment, and a second set of time segments corresponds to forecasted data.

7. The method of claim 6, further comprising:
updating, in real-time, one or more data fields of the second set of data fields corresponding to the current time segment based at least in part on a transaction associated with the OLTP database.

8. The method of claim 6, wherein the query further indicates a value for time-series volume planning and wherein executing the query further comprises:
updating a value of a data field of the data object based at least in part on the indicated value for time-series volume planning; and
updating a plurality of values of at least a subset of the second set of data fields corresponding to the forecasted data based at least in part on the updated value and the historical data, wherein a result of the query is based at least in part on the updated plurality of values.

9. The method of claim 6, wherein the number of time segments comprises fifty-four time segments.

10. The method of claim 1, further comprising:
storing the data object as a row in a first table of the OLTP database; and
storing the first set of data fields and the second set of data fields as columns in the first table of the OLTP database.

11. The method of claim 10, wherein accessing, in the OLTP database, the data object comprises:
searching the first table for the data object according to the unique identifier that supports querying the data object; and
refraining from searching a second table based at least in part on the data object storing the second set of data fields storing the second set of hierarchical data.

12. The method of claim 1, wherein the second set of hierarchical data is stored as an array, a JavaScript object notation field, a field of concatenated values of fixed length, or a combination thereof.

13. An apparatus for storing and querying hierarchical data in an online transactional processing (OLTP) database, comprising:
a processor;
memory coupled with the processor; and
instructions stored in the memory and executable by the processor to cause the apparatus to:
configure a plurality of parent data objects to store a first set of object-specific data for the plurality of parent data objects and a plurality of child data objects to store a first set of hierarchical data for the plurality of parent data objects, wherein a child data object comprises:
a respective set of data fields storing a subset of the first set of hierarchical data,
a respective unique identifier for the child data object, and
a relationship indicator indicating a parent data object of the plurality of parent data objects;
configure a data object to store a first set of data fields comprising a second set of object-specific data for the data object and a second set of data fields storing a second set of hierarchical data for the data object, wherein:
a data field of the second set of data fields stores a subset of the second set of hierarchical data according to a temporal hierarchy defining the second set of data fields, and
the data object comprises a unique identifier that supports querying the data object in the OLTP database;
receive a query indicating a time period for data analysis;
access, in the OLTP database, the data object based at least in part on the query and the unique identifier that supports querying the data object; and
execute the query on the data object, wherein the instructions executable by the processor to cause the apparatus to execute the query are executable by the processor to cause the apparatus to execute the query on at least a portion of the second set of data fields based at least in part on the indicated time period and the temporal hierarchy.

14. The apparatus of claim 13, wherein the instructions are further executable by the processor to cause the apparatus to:
receive an additional query indicating a first parent data object of the plurality of parent data objects, wherein the data object comprises a first relationship indicator indicating the first parent data object as a parent to the data object; and
roll up, at query time for the additional query, data associated with the data object to a data field of the first parent data object based at least in part on the additional query.

15. The apparatus of claim 13, wherein the instructions are further executable by the processor to cause the apparatus to:
refrain from accessing a child data object of the data object to execute the query based at least in part on the data object storing the second set of data fields storing the second set of hierarchical data.

16. The apparatus of claim 13, wherein the instructions are further executable by the processor to cause the apparatus to:
- initially store the second set of hierarchical data in a second plurality of child data objects, each child data object of the second plurality of child data objects comprising one or more data fields corresponding to a specific time segment, wherein the instructions executable by the processor to cause the apparatus to configure the data object to store the second set of data fields storing the second set of hierarchical data are further executable by the processor to cause the apparatus to:
  - transform data from the second plurality of child data objects to the second set of data fields of the data object, wherein the data from the one or more data fields of each child data object of the second plurality of child data objects is stored in one or more data fields of the second set of data fields of the data object corresponding to a same time segment defined by the temporal hierarchy.

17. The apparatus of claim 16, wherein the instructions are further executable by the processor to cause the apparatus to:
- delete the second plurality of child data objects from the OLTP database based at least in part on the transforming.

18. A non-transitory computer-readable medium storing code for storing and querying hierarchical data in an online transactional processing (OLTP) database, the code comprising instructions executable by a processor to:
- configure a plurality of parent data objects to store a first set of object-specific data for the plurality of parent data objects and a plurality of child data objects to store a first set of hierarchical data for the plurality of parent data objects, wherein a child data object comprises:
  - a respective set of data fields storing a subset of the first set of hierarchical data,
  - a respective unique identifier for the child data object, and
  - a relationship indicator indicating a parent data object of the plurality of parent data objects;
- configure a data object to store a first set of data fields comprising a second set of object-specific data for the data object and a second set of data fields storing a second set of hierarchical data for the data object, wherein:
  - a data field of the second set of data fields stores a subset of the second set of hierarchical data according to a temporal hierarchy defining the second set of data fields, and
  - the data object comprises a unique identifier that supports querying the data object in the OLTP database;
- receive a query indicating a time period for data analysis;
- access, in the OLTP database, the data object based at least in part on the query and the unique identifier that supports querying the data object; and
- execute the query on the data object, wherein the query is executed on at least a portion of the second set of data fields based at least in part on the indicated time period and the temporal hierarchy.

19. The non-transitory computer-readable medium of claim 18, wherein the instructions are further executable to:
- receive an additional query indicating a first parent data object of the plurality of parent data objects, wherein the data object comprises a first relationship indicator indicating the first parent data object as a parent to the data object; and
- roll up, at query time for the additional query, data associated with the data object to a data field of the first parent data object based at least in part on the additional query.

20. The non-transitory computer-readable medium of claim 18, wherein the instructions are further executable to:
- refrain from accessing a child data object of the data object to execute the query based at least in part on the data object storing the second set of data fields storing the second set of hierarchical data.

* * * * *